US006792263B1

(12) United States Patent
Kite

(10) Patent No.: US 6,792,263 B1
(45) Date of Patent: *Sep. 14, 2004

(54) REMOTE OPERATIONAL SCREENER

(76) Inventor: Karen Jeanne Kite, 5318 Stirling Ct., Newark, CA (US) 94560

( * ) Notice: Subject to any disclaimer, the term of this patent is extended or adjusted under 35 U.S.C. 154(b) by 0 days.

This patent is subject to a terminal disclaimer.

(21) Appl. No.: 09/639,386

(22) Filed: Aug. 15, 2000

Related U.S. Application Data

(63) Continuation-in-part of application No. 08/943,833, filed on Oct. 3, 1997, now Pat. No. 6,104,923.

(51) Int. Cl.$^7$ ................................................ H04Q 7/20
(52) U.S. Cl. .............................. 455/412.1; 455/412.2; 455/413
(58) Field of Search .................. 455/412, 413, 455/462, 463, 465, 434, 403, 420, 426, 464, 74.1, 77, 88, 550, 555, 556, 557; 379/199, 88.19, 88.2, 88.21, 88.23, 88.24, 88.01, 88.22; 704/235, 200, 277

(56) References Cited

U.S. PATENT DOCUMENTS

| | | | | |
|---|---|---|---|---|
| 4,941,203 A | * | 7/1990 | Patsiokas et al. ............ | 455/517 |
| 5,003,576 A | * | 3/1991 | Helferich .................... | 379/67.1 |
| 5,202,917 A | * | 4/1993 | Wakai ........................ | 379/159 |
| 5,333,176 A | * | 7/1994 | Burke et al. ................ | 455/412 |
| 5,461,667 A | * | 10/1995 | Remillard .................... | 348/468 |
| 5,568,538 A | * | 10/1996 | Tamir et al. ................ | 379/447 |
| 5,572,576 A | * | 11/1996 | Klausner et al. .......... | 379/88.11 |
| 5,646,979 A | * | 7/1997 | Knuth ......................... | 455/563 |
| 5,675,421 A | * | 10/1997 | Ouchi ......................... | 358/402 |
| 5,758,290 A | * | 5/1998 | Nealon et al. .............. | 375/133 |
| 5,768,344 A | * | 6/1998 | Kruger et al. ............... | 379/35 |
| 5,911,119 A | * | 6/1999 | Bartholomew et al. ...... | 455/402 |
| 6,014,559 A | * | 1/2000 | Amin .......................... | 455/413 |
| 6,061,718 A | * | 5/2000 | Nelson ........................ | 709/206 |
| 6,104,923 A | * | 8/2000 | Kite ............................. | 455/412 |
| 6,134,320 A | * | 10/2000 | Swan et al. ................. | 379/372 |
| 6,138,096 A | * | 10/2000 | Chan et al. .................. | 704/235 |
| 6,148,213 A | * | 11/2000 | Bertocci et al. ............ | 455/462 |

\* cited by examiner

Primary Examiner—Jean Gelin

(57) ABSTRACT

This invention provides an audible remote screening function or device for use with an answering device or machine and may also combine this screening function with an ability for remote operational control of an answering device or machine. Preferred forms of the invention provide for remote call screening of an answering device or machine, or remote call screening of an answering device or machine together with remote operational control of an answering device or machine, with the capability to remotely operate and/or remotely screen calls (incoming or pre-recorded) of that of an answering device or machine from a remote area or room via the remote function or device. In preferred forms: the audible remote screening from the device can be heard across a room or from another room; the remote device can be made to stay in an active ON mode eliminating any need for the user to search, locate, or activate the remote device or any command signal per call being screened; the remote operational control and/or screening device can be directly plugged in allowing for simultaneous power and recharge abilities for continuous power and uninterrupted operation ability; a remote-override switch located on an answering device or machine for privacy control over unauthorized access to the answering device or machine from the remote device; and small size for portability. The functions and capabilities of the remote device can be implemented, combined and used in conjunction with/into any other unit or housing.

65 Claims, 14 Drawing Sheets

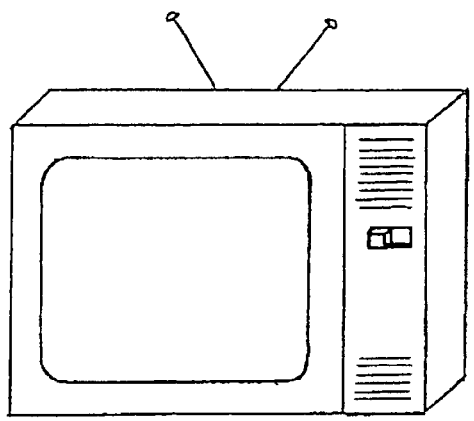
FIG 10
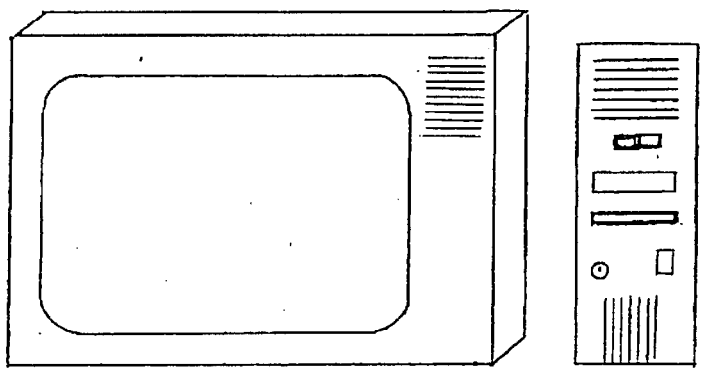
FIG 11
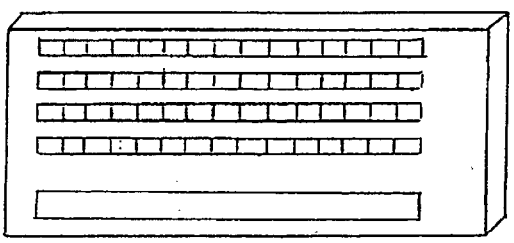
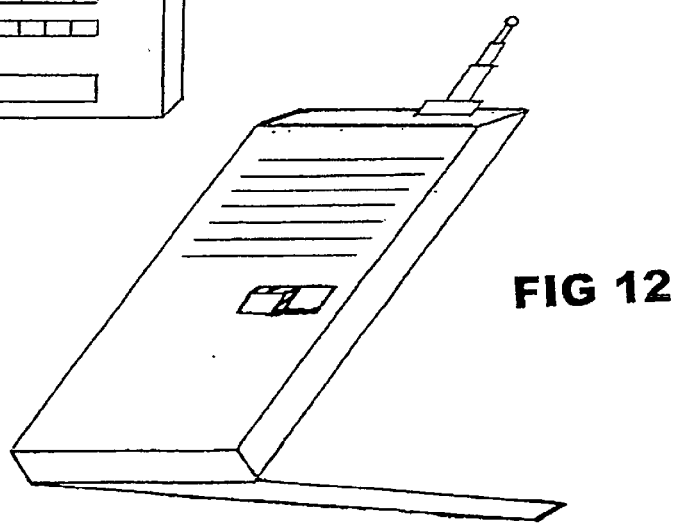
FIG 12

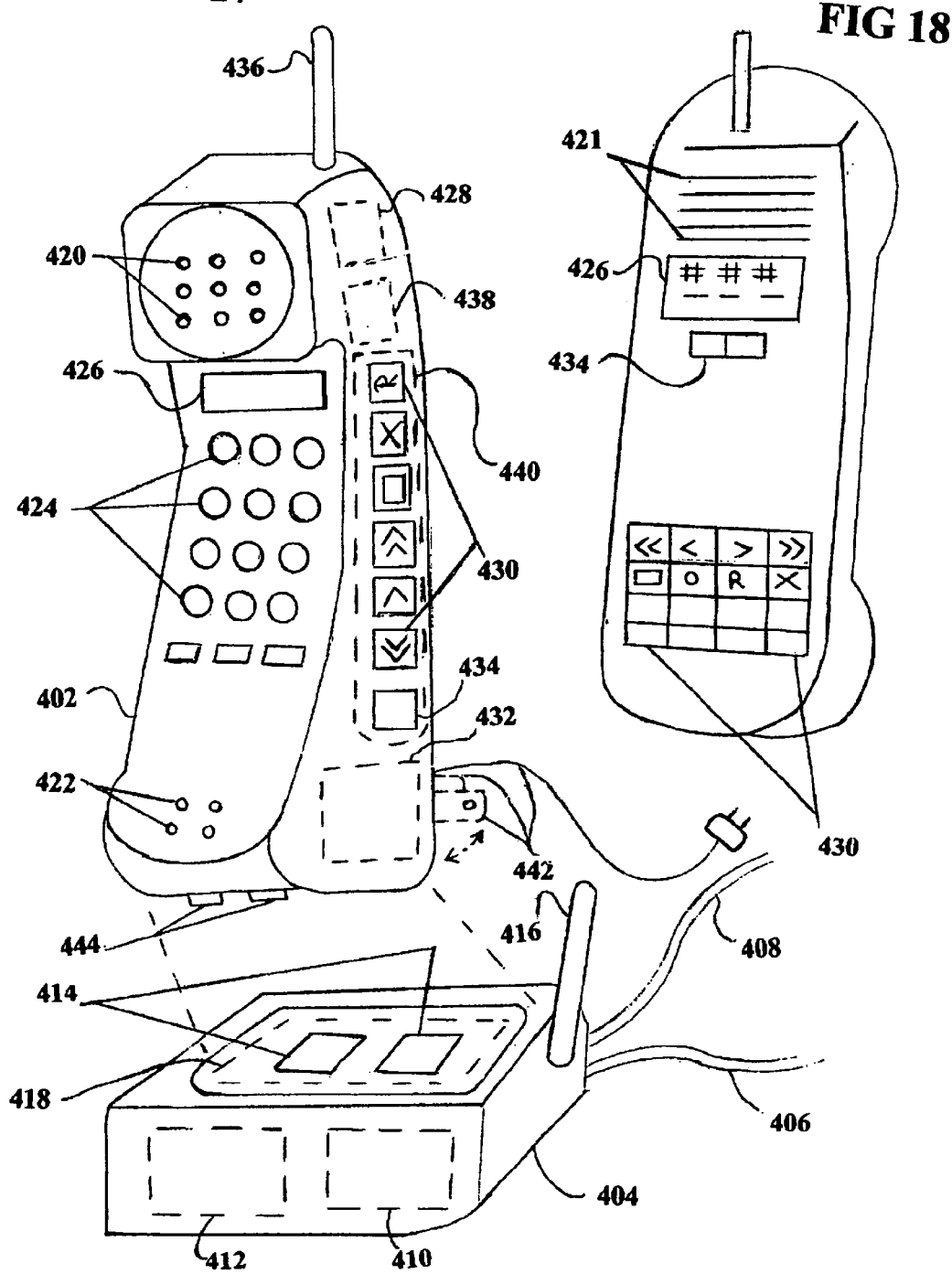

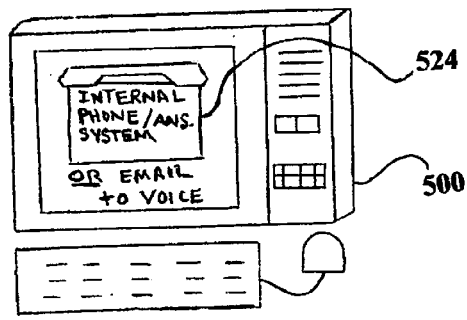
FIG 19A
FIG 19B
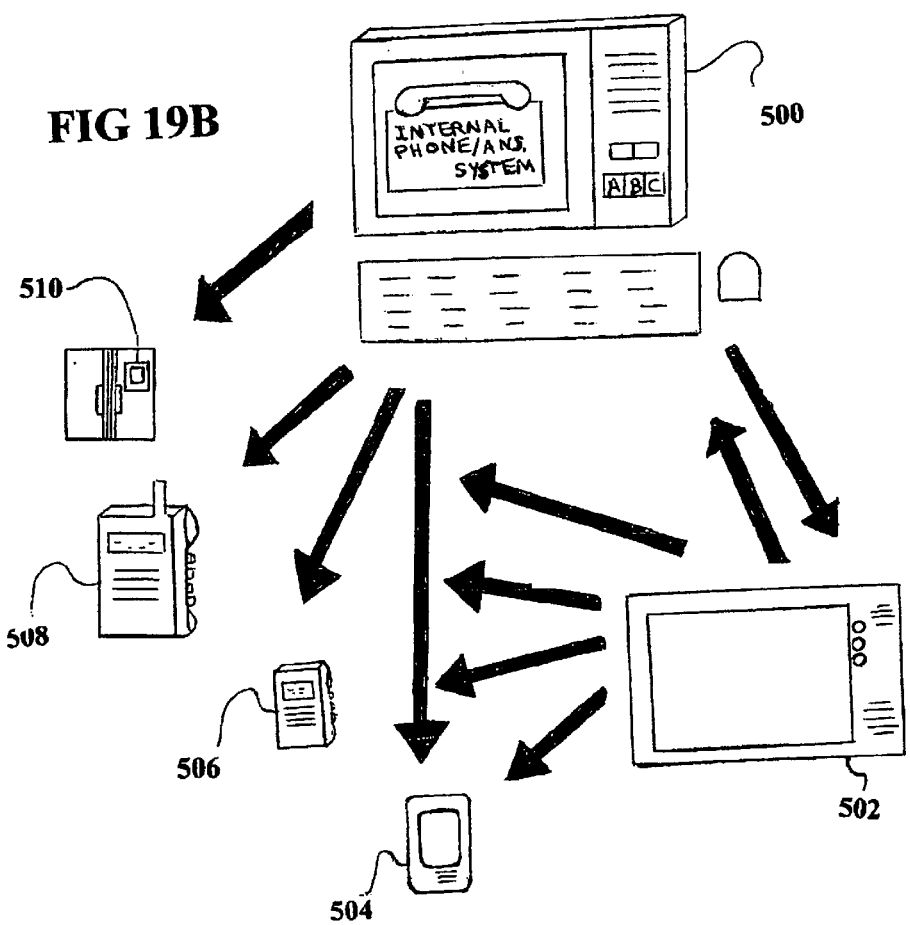

REMOTE OPERATIONAL SCREENER

CROSS REFERENCE TO OTHER APPLICATIONS

This application is a continuation-in-part of application Ser. No. 08/943,833, filed Oct. 3, 1997, now U.S. Pat. No. 6,104,923, issued Aug. 15, 2000.

BACKGROUND-FIELD OF INVENTION

This invention relates generally to telephone answering machines, and more particularly to a remote call screening device that allows a user to monitor and screen incoming telephone calls.

DESCRIPTION OF PRIOR ART

Originally, answering machines could only provide the user with two ways of screening or monitoring his incoming telephone calls. One way is to play back a previously recorded message that was left on an answering machine. The other way is to listen to the loudspeaker of an answering machine at the same time that the caller is leaving the message. In other words, screen the caller. If at this point the user options to converse with the caller, the user can then pick up a telephone plugged into or near the answering machine. But if the user is in a remote location, away from the answering machine unit, such as in another room or across the house, the user may hear the ringing signal of the telephone but will not be able to screen the incoming telephone call to decide whether or not he wishes to pick up the telephone and speak with that calling party, without his having to run to the other room or across the house to where the answering machine itself is located, in order to hear or screen the caller, who is leaving a message, through the loudspeaker of the answering machine.

Also, answering machines are only accessible in limited ways. One way is by direct manipulation of the actual answering machine unit. The second way is by an outside telephone line with touch-tone capabilities or "beeper remote". The third way is by a cordless, touch-tone, telephone with corresponding circuitry integrated within a matching answering machine unit. And this last example is limited in its accessibility to an answering machine.

U.S. Pat. No. 4,881,259 to Scordato (1989) provides an audio "screening mode" in a cordless, touch-tone telephone integrated within an answering machine unit.

A Caller ID provides a visual "screening method" whereby the telephone number from where a caller is calling from (and sometimes a name associated with that particular telephone number) is displayed on an LCD screen, sometimes with an option to store a limited amount of telephone numbers. Caller ID requires that a special Caller Identification Service be used in conjunction with a Caller ID unit. A Caller Identification Service must be purchased from a telephone company, in addition to your regular telephone service, in order to be able to use a Caller ID. The Caller ID units are singular units within themselves or are integrated within a cordless telephone receiver of an integrated cordless telephone and its matching base unit.

Nevertheless, Scordato patent 4,881,259 and Caller ID suffer from a number of disadvantages:

(a) The use of Scordato's system requires a phone.
(b) The use of Scordato's system requires a cordless phone.
(c) The use of Scordato's system requires a cordless telephone that must be integrated with its own matching answering machine/recharger base unit.

In the use of Caller ID units that are included within cordless telephone receivers, the cordless telephone receiver also must be integrated with its own matching recharger base unit.

(d) The Scordato system requires that a switch actuator on the cordless receiver unit be turned "on" in order to activate the "screener mode" in the matching base answering machine unit. This switch actuator must be turned "on" per incoming call in order to be able to screen incoming calls. Scordato's invention must be in one of either an active mode "screen mode" or in a passive mode "non-screen mode". In order to hear/screen an incoming call, the "screen mode" must be activated at the time that a caller is presently calling, and re-activated at the time of each additional call, requiring that the user has to locate and physically be at the cordless telephone receiver of the matching answering machine base unit in order to physically manipulate the actuator command signal (turn it "on") in order to activate the "screen mode" in the answering machine base in order to be able to use this screening function.

(e) The user of the Scordato invention has to physically be at the remote cordless telephone receiver of the matching answering machine base unit, hands on, putting receiver to ear in order to hear the calls being screened as messages are being left.

With Caller ID, the user has to be close enough to pick up and/or be in eyesight (reading) range of any Caller ID unit in order to be able to read the telephone number information on the LCD screen.

(f) With the Scordato invention, telephone calls cannot be screened or listened to by more than one person simultaneously, such as family members who are waiting for their own prospective callers, because the cordless telephone handset receiver of the Scordato invention can only be put to one user's ear at a time in order to hear the call being screened, and only the person whose ear is on the receiver can hear the call being screened.

(g) Scordato's invention has a manufacturer installed, fixed "family code" shared between the answering machine/recharging base unit and its cordless telephone handset receiver unit, thereby limiting its screening use to just one remote screening device: that of the matching cordless telephone handset receiver.

In the cordless telephone version of Caller ID there is also only one cordless telephone receiver per matching recharging base unit, thereby limiting screening use to just one cordless receiver unit.

(h) In Scordato's invention, a cordless telephone handset receiver needs recharging at a home base unit. Therefore, because a cordless telephone receiver consistently needs recurring recharging or sometimes full charging, the receiver is not always capable of being in a convenient or remote location where a user may happen to be.

The same is true of the cordless telephone version of Caller ID, as it also needs recharging at a home base unit. Therefore it also is not always capable of being in a convenient or remote location where a user may happen to be.

(i) In Scordato's invention, the only way to turn the screening mode Off and On has its location in the cordless telephone handset receiver unit. Because there is no separate On/Off switch on the matching answering machine/base unit itself to keep the screening mode on the cordless telephone handset receiver from operating (to disable the screen mode on the cordless handset receiver) at the user's discretion, this does not afford the user/owner with any privacy or control over somebody else picking up the cordless telephone handset receiver and remotely screening the owner's incoming or recorded calls that were left on his answering machine. The user's/owner's only option for this would be to turn the whole answering machine unit off.

(j) In Scordato's invention, the answering machine/base unit does not have an indicator to show that the screen mode is "on" and being used from the cordless telephone handset receiver, thus the user/owner is not able know when somebody else may be operating the screen mode from the cordless telephone receiver and listening to the user's/owner's personal calls. This lacking, also, does not afford the user/owner the option to control his privacy.

(k) The Scordato invention is not capable of recharging and being in a screen mode concurrently, therefore putting limitation on screening availability.

The cordless telephone version of Caller ID is also not capable of recharging and being in a screen mode concurrently, limiting available screening time.

(l) The cordless telephone receiver cannot plug directly into an AC outlet for a constant source of power, again limiting its available screening time to when the cordless telephone receiver is not being recharged in its base.

The same is true, again, of the cordless telephone version of Caller ID.

(m) The cordless telephone receiver is not equipped with a source for an optional adapter plug with cord in order to maintain an active screen mode and a concurrent constant source of power.

The same is true of the cordless telephone version of Caller ID.

(n) There are many other reasons that Caller ID is not very practical, such as:

Most people only have a few telephone numbers memorized in their heads, therefore, as a calling party is calling, the user of Caller ID must rack his brain as to whom the phone number belongs to that is being displayed on the LCD.

If a user is expecting or receiving a call from a first-time caller, the user of Caller ID probably won't have any idea who's phone number is being displayed on the LCD screen of his Caller ID unit. And even if a name is displayed with the telephone number, the user still has no way of knowing who is really on the line nor no way of finding out the content of the call, what it's regarding, etc. through a Caller ID.

If the user is expecting a call from a favored someone (favored caller) who happens to be calling from a different phone or location than what is stored for them in the Caller ID unit or memorized in the user's head for that particular person, the user is at a loss as to who is calling.

The user may not wish to converse with other-wise-favored callers at certain particular times, though these callers may have their phone numbers stored as preferred caller numbers in the Caller ID unit.

The user may not wish to converse with a caller depending on what kind of message the caller has for him or what the caller has to say, and a Caller ID LCD phone number display is not going to help in these instances, whether or not the caller is calling from a preferred number.

The user may wish to speak to only a certain particular caller from a selected stored phone number and not to the other people that may live there at that same number, but the user of the Caller ID unit is not able to discern who from that telephone number really is calling.

So, in regards to that just mentioned, and also for that of non-stored telephone numbers or non-familiar telephone numbers, in order to really screen his calls, the user would then still need to be at his answering machine unit in order to hear the calls being screened, despite having Caller ID.

(o) Caller ID requires that a special Caller Identification Service be used in conjunction with a Caller ID unit. The service must be purchased from a telephone company in addition to your regular telephone service in order to be able to use a Caller ID system. This service is only available where the service is provided.

(p) In order to protect their own safety and privacy, most consumers have chosen to block Caller ID so that their own personal telephone numbers will not be forwarded to someone else's Caller ID unit, in order to keep their telephone number private and their location private, for safety and other privacy reasons.

Objects and Advantages

Accordingly, there are several objects and advantages of the present invention, and with additional features, there are even still further objects and advantages. The remote screening device and/or its functions and capabilities, and the remote operational/screening device and/or its functions and capabilities of the present invention are herein referred to as Remotes. Call receiving and storage devices will mostly be referred to as answering machines, but are not restricted to such. Objects and advantages of the present invention are:

(a) To provide an externally audible Remote screening device to be used for or with a call receiving and storage device including call answering machine, service, device, or message storage.

(b) To provide an externally audible Remote screening device with remote operational capabilities to be used for or with a call receiving and storage device including call answering machine, service, device, or message storage.

(c) To provide an answering machine Remote device(s) that is not limited to the use of a phone. No phone is needed.

(d) To provide answering machine Remote device(s) that are not limited to use of a cordless telephone or any other type of phone. No specific type of phone is needed.

(e) To provide Remote device(s) that are not limited to touch-tone use or signal tone use.

(f) 1. To provide Remote device(s) that can be heard, listened to, and understood (is audible) from a distance away from the actual Remote screening device, such as heard from across a room or heard from another room or area (because a Remote is outwardly audible), without necessitating that a user has to physically be at the place where a Remote unit is presently located. Without necessitating that the user, as in the case of the Scordato patent, have to get up and go across a room or go to another room in order to pick up the cordless screening telephone receiver because of the need to put the cordless screening telephone receiver up to one's ear in order to hear the caller being screened.

2. To provide a Remote device where the user does not have to be within reading distance of a visual screening unit, as is the case with Caller ID, in the order that he must see a phone number being displayed in order that he may screen a call.

(g) 1. To provide for a Remote device(s) that allows for more than one person at a time to be able to hear the calls being screened. The calls can be screened simultaneously by, for example, the whole family, roommates, co-workers, etc. allowing for all of them to screen, or listen, simultaneously, while waiting for their own individual, prospective callers, as there is no need to put a screening telephone receiver up to any one individual's ear. My invention is outwardly audible and can be heard from a distance from itself, eliminating the limitation of only one user at a time who can screen. This thereby allows for every individual, in a household, for example, to discern whom the call is for and discriminate whether or not it is for him or her.

2. To provide for a Remote device where there is no need for everyone to get up to look at and read a telephone number being displayed on a visual display screen in order to screen their calls.

(h) To provide a Remote device(s) that is able to stay and remain in an active screening mode (On) without necessitating that the user, as in the case of the Scordato patent, has to actively search, locate, and/or physically be at a screening telephone handset receiver unit in order for the user to have to activate a command that allows for the screening process per incoming call. Eliminating this requirement, and/or providing alternative methods, allowing for a Remote device to remain and stay in an active (On) mode, provides for convenience, and is also thus potentially faster as the user is not likely to miss screening a call, or part of a call, due to a possibility of having to spend time searching for a screening handset receiver that may be located elsewhere in another room or across the house, for example, and then, once located, having to activate its screening process.

Depending On Embodiment, Further Objects and Advantages are:

(i) To provide remote operational and/or screening devices, units, or capabilities that either/and/or:

1. Do not require a fixed "family code" between an answering machine and Remote device(s), as this can limit the user to just the matching Remote devices that may be packaged along with a paired answering machine and can further limit the possible later purchase of additional Remote devices for the possible use in more areas, or rooms, at a time, and/or possibly, 2. By providing that Remotes may be made to be programmable to work with an answering machine, and/or that Remotes may be made to be manipulated into fitting into a fixed "family code" of an already purchased answering machine that has a fixed "family code", and/or possibly, 3. By providing that answering machines can be manufactured as "Remote compatible", this allows the possible purchase and addition of multiple Remote devices or units at later dates, and/or possibly, 4. By providing that several Remote devices at a time can be packaged along with its paired answering machine unit. This may or may not involve a fixed "family code".

(j) To provide a Remote capability or device that can give the choice of different channels or frequencies for:
1. best reception abilities, and/or
2. so that other persons in, e.g. the same household or neighboring area, may own and operate their own individual Remote units and answering machine units, without interference from or with another neighboring person's units.

(k) To provide a Remote device that can plug directly into an AC outlet for a constant source of screening and/or operating power.

(l) To provide a Remote device that has the capacity to recharge and still be able to concurrently operate, and/or receive and transmit a screened call so that screening and/or operating usage can be indefinite.

(m) To provide a Remote device(s) that doesn't need recharging in a "home base" unit, thereby adding to its convenience, as a Remote unit or device is more capable of constantly being available to the user in remote locations without having to return it to a "home-base" recharging unit. And with the use of multiple Remote units or devices, several variable remote locations are available simultaneously for placement.

(n) To provide a Remote device with the means to remotely operate and access the functions of an answering machine.

(o) To provide an answering machine with a separate On/Off control switch for the overriding control of the Remote device(s). This Remote-override control switch, located on the answering machine, separate from the answering machine's own main On/Off switch, allows the user to turn Off the Remote(s) abilities from the location of the answering machine unit itself without having to turn off the whole answering machine. This thereby prevents someone else from unauthorized remote usage of the Remote unit(s). This overriding control switch provides the user with control of his privacy; no one will be able to remotely screen the user's calls nor operate the user's answering machine from the Remotes, and, yet, the user is still left with the operable use of his answering machine's own usual functional capabilities, as the answering machine is still in its own On mode.

(p) To provide a simple to use Remote device or unit, preferably small in size, and light in weight, with a greater ease of portability, that can be kept and/or transferred to and from inconspicuous placements, providing for greater accessibility.

(q) To provide the user with an answering machine remote operational device that provides life with a little more convenience, saving time and labor, as the user will have the ability to operate and access his answering machine and/or screen his calls (incoming or recorded) remotely from another room, from a distance, or from outside, away from an answering machine unit, with a Remote unit, device, or capability. A Remote can be remotely placed, and simultaneously be kept in an active On mode. This eliminates any need for the user to have to get up and/or turn On any activation mechanism per incoming call being screened.

(r) To provide and realize an almost untapped market and an existing need. What is on the market is either relatively unknown, uneconomical, and/or unpractical. Since portable phones with their matching answering machines can be a relatively expensive purchase, what my invention provides is more economical for the consumer than the Scordato patent, as in a preferred embodiment there is no need for the purchase or use of a cordless phone, and more than one Remote can be used with, and/or included with, an answering machine.

In order to use a Caller ID system, a person must pay not only for the special equipment, but they must also pay a phone company for the added Caller ID service that must be purchased in order to be able to use Caller ID. And, most importantly, Caller ID is not very practical; Since most people don't like their telephone numbers being given out, and most people have opted to block Caller ID, which means that no matter even if a user has Caller ID service, those numerous people who have blocked Caller ID have phone numbers that are not accessible to the user with a Caller ID system: They are "unscreenable".

(s) To provide for a more cost effective means for manufacturers and consumers:
1. Since circuitry is less complicated than the Scordato patent, it should be cheaper to build, and in turn should be less expensive for consumers to buy. Less expensive equals more affordability for the consumer, which, in theory, equals a higher probability that the masses will buy.
2. Most households contain at least one answering device or machine. Most answering machines are replaced every few years; therefore my invention should be easy to sell not only to consumers, but to manufacturers as well.
3. In providing the option of more than one Remote, or numerous Remotes that are capable of being used in conjunction with or interacting with a telephone answering device or machine, and/or the option of being able to use and purchase additional Remotes at a later date than the original purchase of an answering device or machine, gives the purchaser a broader consumer choice and a greater array of remote abilities. This is also another potential selling point to and for a manufacturer.
4. Even throughout a changing technology, my invention could be made and sold for many years without becoming outmoded or obsolete. Hence, it has a long life cycle potential, which would justify capital expenditures for tooling and conducting advertising campaigns.

The user is thus provided with a remote call screening unit or capability, and/or remote call screening unit or capability along with remote operational capability, to be used to listen to, remotely screen, and/or remotely operate and access an answering machine, with either of the units (the Remote or the answering machine), or each unit, having appropriate inner workings to allow such capabilities, the features not restricted to any particular type of telephone or to any telephone at all. Such an invention has not even been hitherto available.

Still further objects and advantages, many not already mentioned above, will become apparent from a consideration of the ensuing specification, claims, and drawings.

BRIEF DESCRIPTION OF THE DRAWINGS

FIG. 1A shows a front perspective view of a possible basic Remote without On/Off or volume control, that is "On" and audible as long as power source is available.

FIG. 1B shows a perspective view of a possible basic Remote that includes volume control, the unit being "On" as long as there is a power source available.

FIG. 1C shows a possible embodiment of a Remote with single or combined "On/Off"—volume controller.

FIG. 1D shows a possible embodiment of a Remote with "On/Off" control, without a volume control, the unit audible as long as unit is turned "On".

FIG. 1E shows a possible embodiment of a Remote with separate "On/Off" and volume controls.

FIG. 10 shows possible embodiment of Remote included within a TV set.

FIG. 11 shows possible embodiment of Remote included within a computer system.

FIG. 12 shows possible embodiment of Remote included within a cellular phone or car phone.

FIG. 17 shows an integrated device with a handset that combines the functions of a cordless telephone receiver with those of an answering machine and call screening Remote unit.

FIG. 18 shows a rear view of the handset of FIG. 17.

FIGS. 19A–19F show pictorial schematics of various embodiments and systems of a call screening device according to the present invention.

SUMMARY OF THE INVENTION

Figure 1B:
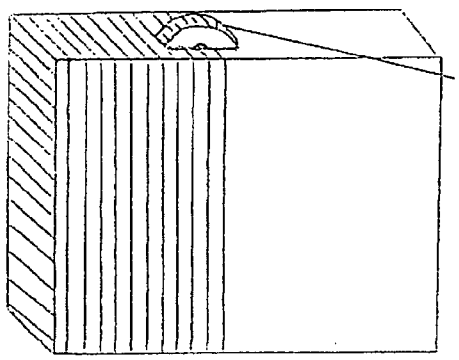
FIGS. 1A, 1B, 1C, 1D, 1E show front perspective views of some of many possible variants of basic Remotes in self-contained units.

In a household, as also in some businesses, there is usually only a single telephone answering device or answering machine unit. The answering device or answering machine unit is located in one room of the house, or business, and usually more than one telephone extension of that same phone line is spread throughout the house with different telephones in different rooms. This poses a problem when someone in one room wants to access the answering machine, or screen an incoming (or recorded) call, and that answering machine is located in another room across the house. How does the user accomplish this without having to get up to go into the room where the answering machine unit is located? The solution is as follows:

Example: When an answering device or answering machine (preferably of the remote pick-up type) receives a caller's message, it simultaneously picks up and transmits the caller's voice to the user who, away from the answering machine unit, in some remote location, hears the caller's voice through a Remote unit or device. The user hears the caller's voice and can screen the call as the message is being left, through the Remote unit or device, though he is not at the location of the answering machine. The user is able to do this through the interacting of the Remote(s) with an answering machine, which allow the user (from a remote location, away from the answering machine unit) to conveniently screen calls, or select which calls he options to pick up and speak with, all at the same time that the calling party is currently leaving a message. The user can have the ability of screening incoming calls, (and/or recorded calls, depending on embodiment), hear who's calling and the content of the message, from any convenient place, such as e.g. another (remote place) room in the house, outside of the house, etc. Depending on embodiment, the Remote(s) are capable of being transported easily for more convenience; a user may wish to place a Remote near a telephone (of any type) of the same extension that is connected to the answering machine, (the telephone being set up in any area such as outside, across the house, in another room, downstairs, etc.) enabling easy access to pick up the screened phone call should the user option to.

Because most modern telephone answering devices or machines are of the remote pick-up type (wherein the answering machine will revert to dormant status immediately upon pick-up of any telephone extension connected to the same line), transmission of the caller's voice to a Remote will also stop upon pick-up of any phone extension of the same line, in such that the user may then have a private conversation with the caller.

Depending on embodiment, the user may also manipulate any remote operational or function controls and/or recording controls that may be located on a Remote, enabling the user to access and/or operate an answering machine remotely with the Remote, from a neighboring area.

DESCRIPTION OF THE PREFERRED EMBODIMENTS

While this invention is susceptible of modifications, methods of operation, and embodiments in many different forms, there is shown in the drawings and will herein be described (in detail) some preferred modifications and embodiments of the invention with the understanding that the present disclosure is to be considered as an exemplification of the principles of the invention and is not intended to limit the broad aspect of the invention to the embodiments illustrated, and that changes may be made therein without departing from the scope of the invention.

The present invention allows for a Remote that is capable of interacting with a call receiving and storage device including call answering machine, service, device or message storage, allowing the user to (depending on embodiment):

a. conveniently hear and screen incoming calls remotely, through the Remote, without the caller knowing that he/she is being screened, and/or b. remotely operate his answering machine and its various functions through the Remote.

All possible from a remote area, or areas, away from or elsewhere from where an answering machine actually resides.

"Answering machine" is used in this text to mean any answering machine, service, answering device, or message storage center designed to receive and/or store messages.

In preferred embodiments, the Remotes are small in size.

Figure 1C:
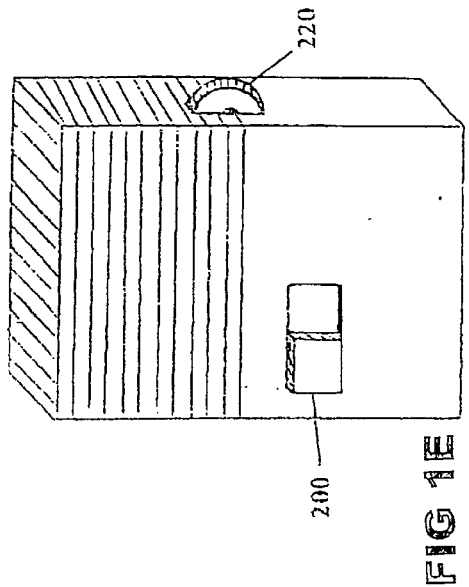
Figure 1A:
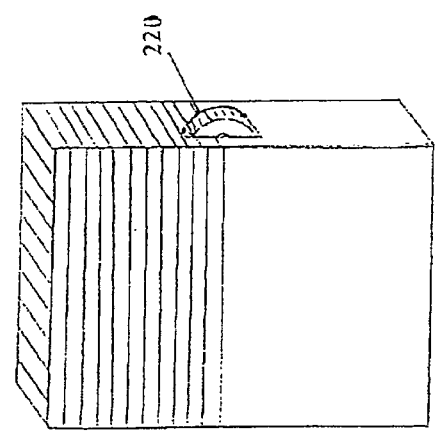

FIG. 1A shows a possible embodiment of a basic Remote without "On/Off" switch or volume control switch, the Remote being "On" and audible as long as power source is available.

FIG. 1B shows another possible embodiment of a basic Remote that includes a volume control 220, the Remote being "On" as long as there is a power source available.

Figure 1D:
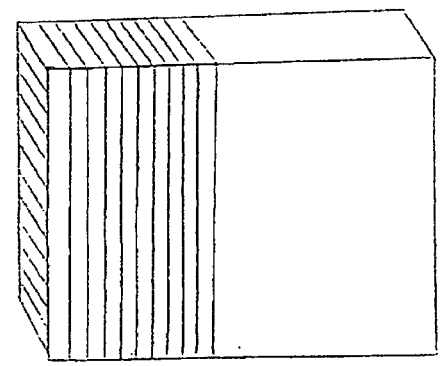
Figure 1E:
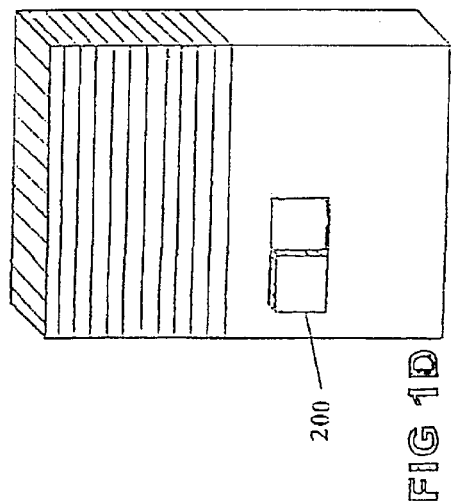

FIGS. 1C, 1D, and 1E show some of other possible embodiments of basic Remotes with variable "On/Off" and/or volume controls. FIG. 1C shows a possible embodiment of a Remote with a combined "On/Off" and volume controller 221. FIG. 1D shows a possible embodiment of a Remote with "On/Off" control 200, without a volume control, the Remote being audible as long as Remote is turned "On". FIG. 1E shows a possible embodiment of a Remote with separate "On/Off" 200 and volume 220 controls.

The following of some of many possible Remote features and functions are shown collectively in some drawings but are not restricted to such or any specific number or combination. They may be embodied alone, in many of any combinations, together in different combinations, and/or collectively together on a Remote unit.

Figure 2:
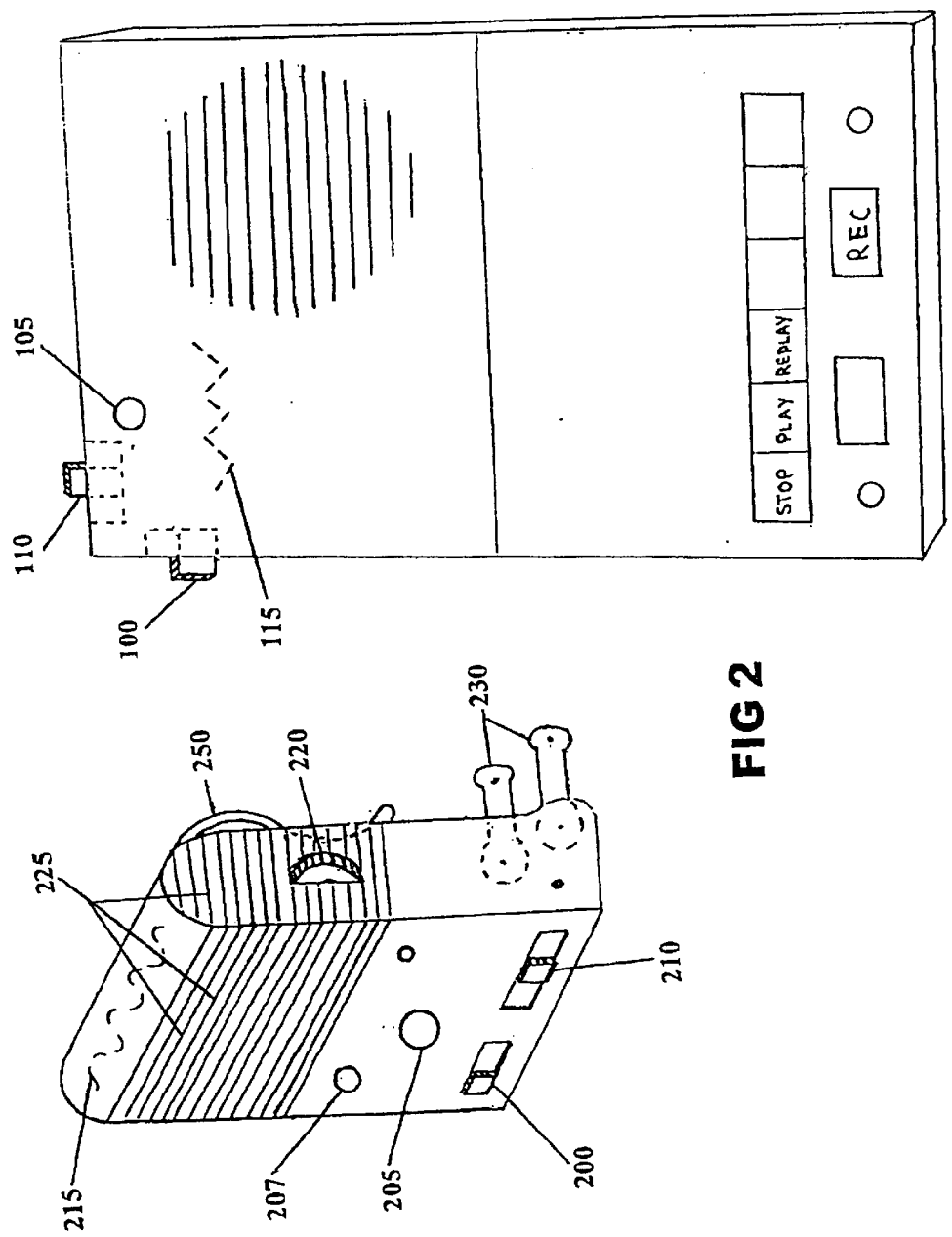
FIG. 2 shows a front perspective view of a possible Remote, with additional possible features, and FIG. 2 also shows an example of a possible telephone answering machine that embodies some possible additional features that may be used together with Remotes.

FIG. 2 shows a possible embodiment of a Remote with possible variable, additional features, and FIG. 2 also shows a possible embodiment of an answering machine unit with possible variable, additional features.

Figure 3A:
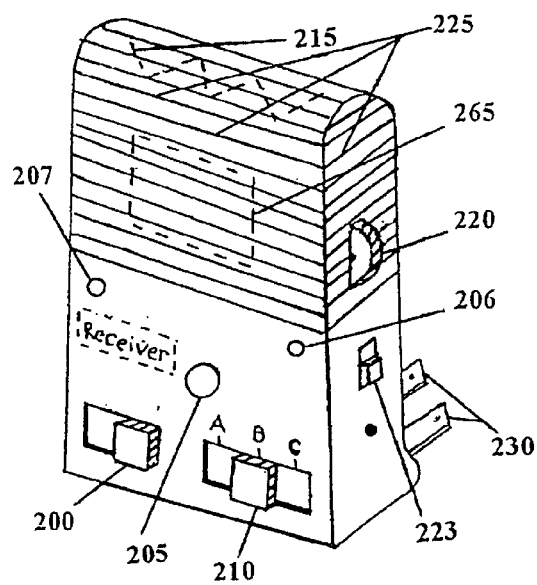
FIG. 3A shows another front perspective view of a possible Remote.

FIG. 3A shows another drawing of an embodiment of a Remote with some of many possible variable features.

In a preferred embodiment, the user may manipulate an ON/OFF control switch, dial, knob, button, etc. 200 (FIG. 3A) that regulates the control of the functional capabilities of a Remote. The user may turn the Remote ON or OFF at his convenience. The user has the option to leave the Remote in an ON (or active) mode, thereby enabling a constant receiving (screening) ability and/or the constant remote operational ability of an answering machine. For example, the user need not have to activate any actuator ("On" mechanism) per incoming call in order to hear (screen) that incoming call since, if the Remote is left "ON", the Remote will automatically emit the voice of the caller. The user has the option of leaving a Remote in an active (ON) mode, thereby eliminating any need to actively locate and physically be at a screening device in order to have to turn the screening capacity ON every time there is an incoming call (as is the case with the Scordato patent).

Embodiments of a Remote may include any number of indicator lights (LEDs, light emitting diodes). An LED 205 (FIG. 3A) can be used as an indicator for power, indicating Remote is ON (active), and/or as an indicator for distance, letting the user know when the Remote is out of range. This LED or any other one, example 206 (FIG. 3A), may also serve as a privacy indicator, letting the user know that someone else is accessing his previously recorded messages, that other person either accessing these messages at the answering machine itself, remotely by phone, by another Remote, etc. An LED, example 207 (FIG. 3A), can be used to indicate recharging of a Remote. Any LED can also be made to show how many messages have been left on an answering machine by blinking the corresponding number of messages.

The circuitry that enables these abilities are already known in the art.

Figure 3B:
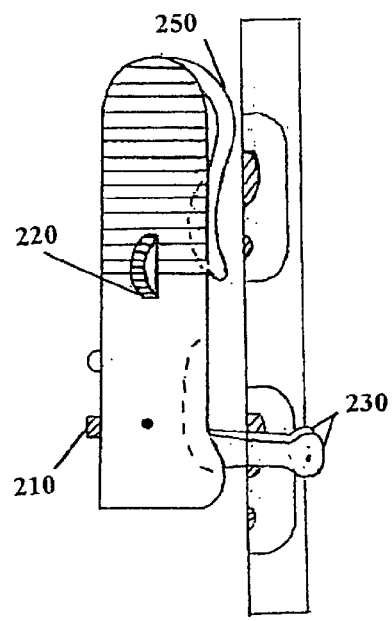
FIG. 3B shows a side view of a possible Remote shown in contact with an AC outlet.
Figure 3C:
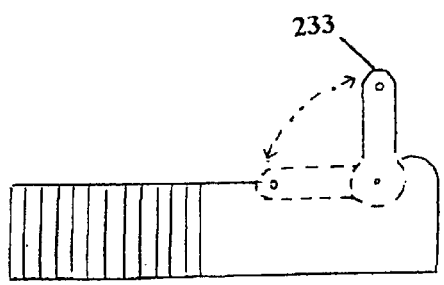
FIG. 3C is a side view of a possible Remote showing possible different pivotal positions of a possible collapsible or moveable AC prong.
Figure 6A:
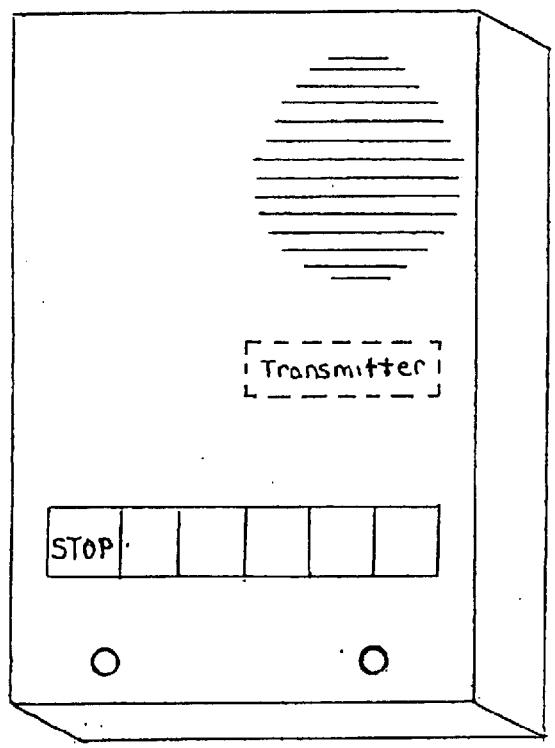
FIG. 6A shows a front elevation view of an example of a possible basic answering machine that can be used with a Remote.
Figure 6B:
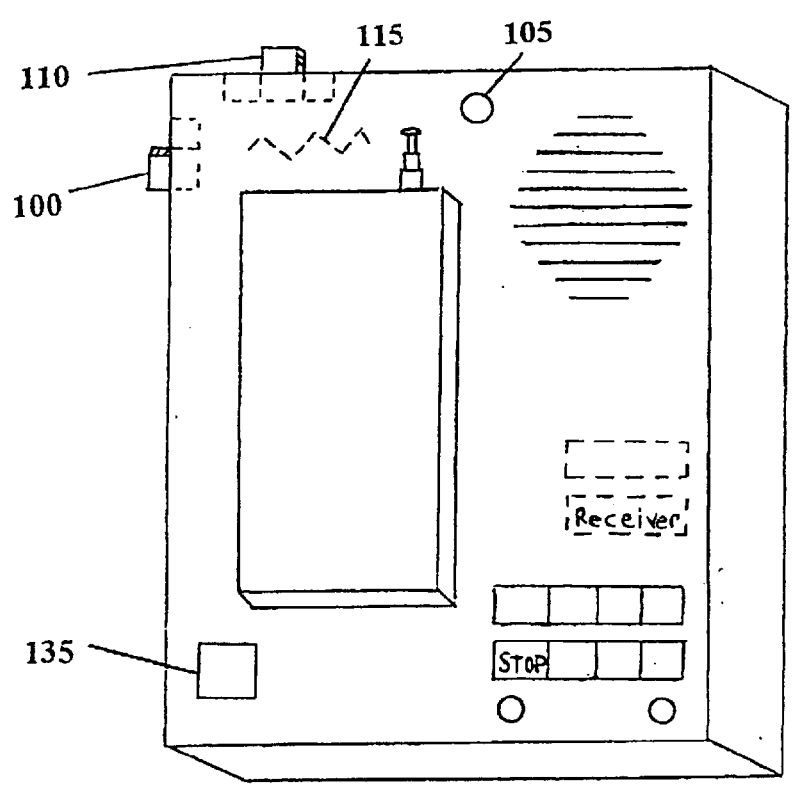
FIG. 6B shows a front elevation view of a possible answering machine that embodies possible additional variable features that can be used together with a Remote unit.

An embodiment of a Remote unit may include; automatic scanning and adjusting ability enabling a Remote to automatically scan and adjust over multiple channels or frequencies to best frequency reception, and/or an automatic channel select and scan control button or dial {example 208 (FIG. 3F)}, and/or may include a manipulable channel/frequency selector/switch {example 210 (FIG. 3A)} with which to be able to manipulably choose from certain multiple channels or frequencies. An answering machine may possibly also include multiple channels or frequencies: automatic, and/or manipulable, and/or selectable 110 (FIG. 6B).

Multiple channels or frequencies allow for e.g.:

a. best reception ability and/or b. so that, for example, other persons in that same household, business, or neighboring area, who may have their own personal answering machine and Remote(s) may be able to switch their own units (answering machine and/or Remote) to a non-interfering channel/frequency, and/or have a Remote that is capable of automatically scanning to clearest frequency.

An example of one kind of possible manipulable channel/frequency selector with a manipulable selector switch from which to choose from certain multiple frequencies or channels: Parents in a household set their answering machine and/or Remote(s) to the channel/frequency "A" (see 210, FIG. 3A), while their teenager, who has his own answering machine and/or Remote(s), sets his unit(s) to the channel/frequency "B", etc. thereby eliminating potential interference.

Another possible advantage: Remotes may be manufactured to be able to be used interchangeably, for example: to work in conjunction with either the parents' or teenager's answering machine unit, by matching-up channel/frequencies on the units, and/or, likewise, an answering machine unit may be manufactured to work interchangeably with either the parents' or teenager's Remote unit(s), by matching-up channel/frequencies. Another example for use of a manipulable channel/frequency selector/switch with which to be able to manipulably choose certain channels: The teenager, if given an instruction by his/her parents, may be able to listen for (screen) the parents' answering machine, from the convenience of the teenager's own room, for that specific, important call that the parents are waiting for that must be answered personally; This may be done by switching the frequency or channel of the teenager's own Remote unit from channel "B" to match that of his parents' answering machine unit or Remote, channel "A". This interchangeability would not affect the ability of the parents' answering machine's continuing regular functioning. This possible frequency/channel selector interchangeability between an answering machine and other Remotes allows (provides the consumer with) much versatility, convenience, and economy.

and/or c. an answering machine and its manufacturer accompanying Remote(s) can have factory predetermined matching "codes" so that signals are only sent to matching "coded" units, thereby eliminating potential interference with other answering machine and/or Remotes that may be within, for example, the same household or neighboring area. An embodiment of this nature can also be made with or without the ability to automatically scan and adjust frequencies or channels; with or without automatic select and scan button; with or without manipulable channel/frequency selector/switch option. Inclusion of channel/frequency selection, automatic or otherwise, on either of, or both, an answering machine and/or Remote(s) in an embodiment of this nature, can still be a useful tool for the user to obtain optimum reception, privacy and/or versatility.

If there is a predetermined matching "code" between an answering machine and its Remote(s), the factory can include any plurality of matching "coded" Remote to accompany the answering machine unit in its manufacturer packaging. Allowing more than one matching "coded" Remote to accompany an answering machine, thereby conveniently allows the consumer numerous possible variable and simultaneous placements of more than one Remote at a time. And depending on how many Remotes that may be packaged together with an answering machine unit, this also provides the consumer with choice of economy.

Embodiments of an answering machine and Remotes that do not include a factory predetermined matching "code" between the answering machine and the Remote(s), allows for the consumer, at his own discretion, the possible later date purchasing of numerous, additional Remotes that, again, can be used in numerous, convenient, variable placements and locations, simultaneously.

Remotes can be manufactured to be programmable for use with answering machines, so, for example, in the case where a "code" is needed or there is a predetermined matching "code" between answering machine and Remote units already purchased, additional Remotes can be purchased later and programmed to match the "code" of the answering machine unit.

Remotes can be manufactured in different ways to work or interact with answering machines, including: being manipulable, and/or being pre-manufactured, and/or being programmable, to work with answering machines.

The circuitry that allows such abilities is already known in the art.

Figure 4A:
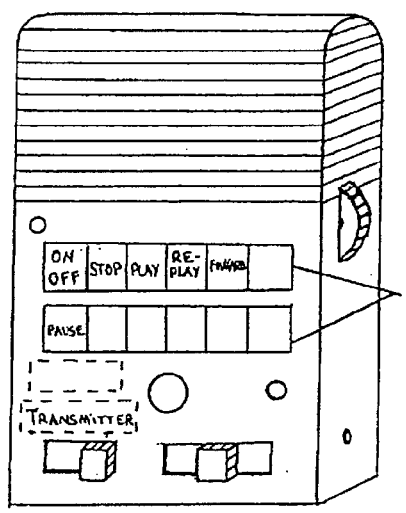
FIG. 4A and FIG. 4B show front perspective views of possible Remotes showing some possible embodiments that include additional remote operational or remote control function(s) and feature(s) that are usable with an answering machine.

A possible embodiment of a Remote may include the ability to remotely operate and access an answering machine. A Remote embodiment having function controls, example including such as some shown collectively 270 (FIG. 4A), and capabilities to remotely operate an answering machine's possible numerous, variable functions, including such as: on/off, stop, play, replay, forward, back, listen, pause, etc. from a Remote, with necessary remote function controls located on a Remote. Some of these functions allow a user to remotely screen or listen to previously recorded calls externally audibly through a Remote. Remote operational or remote control access to an answering machine that may be, for example, located in one room upstairs while the user is downstairs in the kitchen, allows the user the ability to access the upstairs answering machine, listen to previously recorded messages left from callers, leave new outgoing messages on the answering machine, etc. all from the convenience of the downstairs room where he is now at presently.

And the Remote being externally audible allows all members of e.g. a family the opportunity to all be able to hear the calls that were left on the answering machine, eliminating any need for each family member from having to take turns to each individually pick up a screening receiver in order to have to put the receiver up to their own ears, activate the proper switch, and only then being able to listen to the calls (as would be the case with the Scordato patent).

This remote accessibility to an answering machine affords the user convenience in his everyday life.

The circuitry for remote operation is generally well known in the art.

Figure 4B:
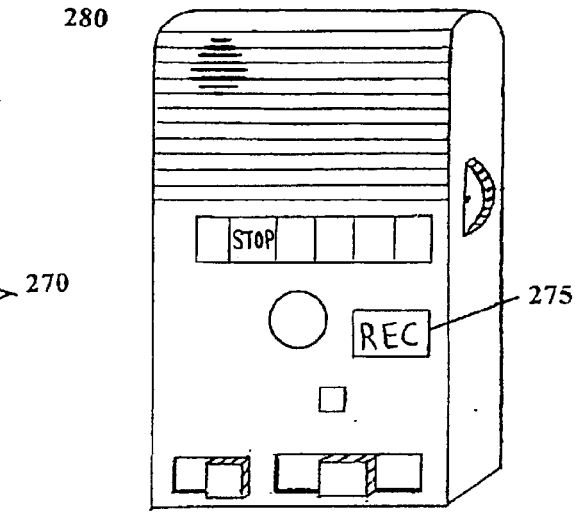

A possible embodiment of a Remote may include the capability to remotely record onto an answering machine from a Remote, with microphone 280 (FIG. 4B) and record control button/switch 275 (FIG. 4B). The circuitry for such is generally well known in the art. This remote recording function could be used for such as remotely recording outgoing announcements on an answering machine, and/or for leaving "memo" messages on an answering machine from, for example, another room in the house.

An embodiment of a Remote can be manufactured so that the user can hear a telephone's ring, or some kind of alarm signal, through a Remote without having to be near or within earshot of a telephone's ring. This can provide for, if, by chance, the user has his telephone ringer off or can't hear his telephone ringer, the user, hearing the ringing signal from a Remote, will still be alert to the fact that a call is about to come through so that he may then listen (screen) through his Remote. If an embodiment of a Remote exists that does include a ringing signal, that embodiment might also include a switch to turn that Remote's ringing signal OFF or ON 223 (FIG. 3A).

An embodiment of a Remote may have any LED light up or flash in conjunction with a ringing signal or instead of a ringing signal. A lit or flashing LED would be an extra alert in case a user cannot hear a ringing signal from a Remote due to external noise. Depending on embodiment, if the user has opted to turn OFF the ringer switch on a Remote, he may still be able to be alerted that an incoming telephone call is coming through, being made aware by a lit or flashing LED.

A Remote may include an antenna for optimum reception and/or transmission of received and/or transmitted signals. A Remote's antenna may be manufactured: internally 215 (e.g. FIG. 3A) within the housing of a unit or have a conventional external antenna (not shown).

The use of antennas, internal or external, is already known in the art.

An embodiment of a Remote may include a volume control, example 220 (FIG. 3A) that may be adjusted in response to signals received from an answering machine, whereby the audible sound coming from a Remote may be adjusted higher or lower.

Figure 3D:
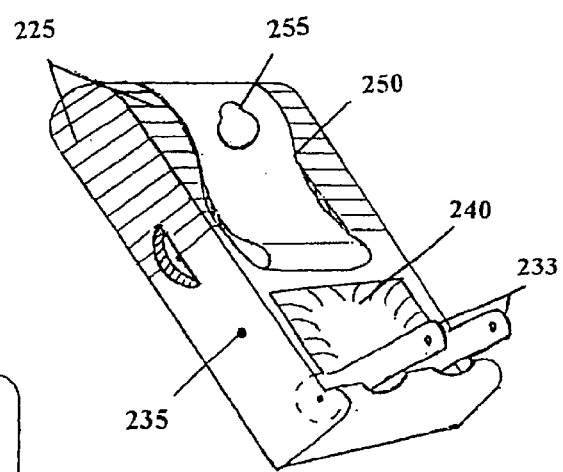
FIG. 3D is a rear perspective view of a possible Remote showing a possible surrounding audio speaker vent or grill and also showing a possible sunken recess portion for a possible collapsible AC prong when in collapsed state.

FIGS. 3A and 3D show possible embodiments of Remotes with audio venting or grill 225, with preferred embodiment having audio venting that surrounds a Remote unit for optimum sound emission in all directions. This allows for a Remote to be placed at any angle with an ability to transmit externally audible sound in all directions.

Audible sound emitted from a Remote could be a caller's voice, incoming and/or recorded, and/or a telephone ringing sound, depending on embodiment.

Figure 3E:
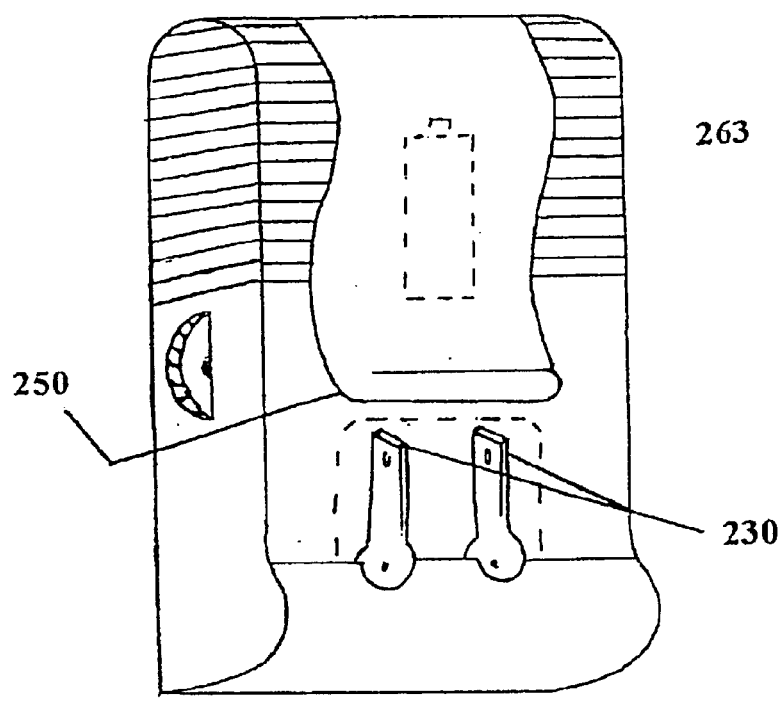
FIG. 3E is a rear perspective view of a possible Remote showing a possible belt clip and also showing a possible AC prong in a collapsed state.
Figure 3F:
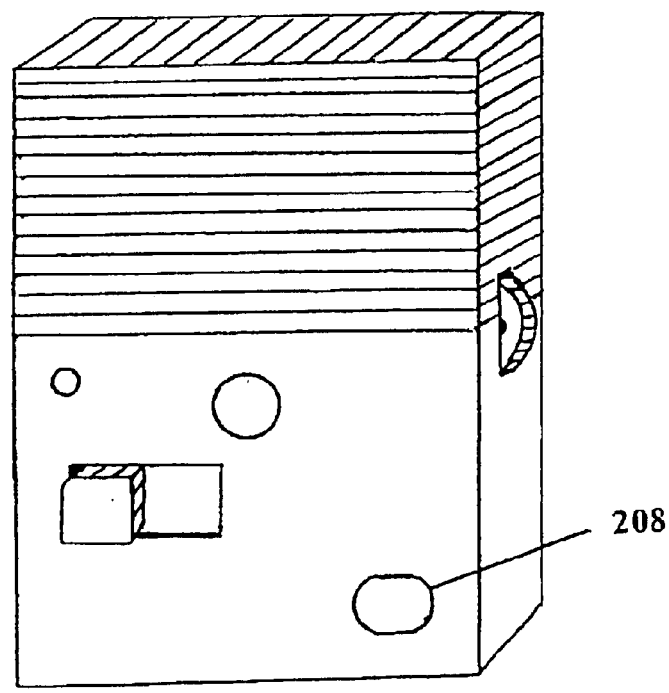
FIG. 3F shows a possible Remote embodiment that includes a channel select/scan button.

FIG. 3B shows a possible embodiment of a Remote that includes a connector prong or plug 230, shown here in contact with an AC outlet. FIG. 3C shows a possible embodiment of a Remote with a collapsible, moveable, fold-out, or pivotal prong 233. FIG. 3D shows a rear perspective view of a possible embodiment of a Remote that includes a possible recessed area 240 for a possible collapsible, prong. A recessed area may allow for a greater ability for a collapsible, retractable, moveable, fold-out, or pivotal prong in its collapsed or retracted state to lay flush or almost flush with the housing of a Remote. A possible example of how this may work is shown in FIGS. 3C and 3E, though this feature may be embodied in many different ways. A collapsible or moveable prong allows for greater ease of portability of a Remote.

Figure 5A:
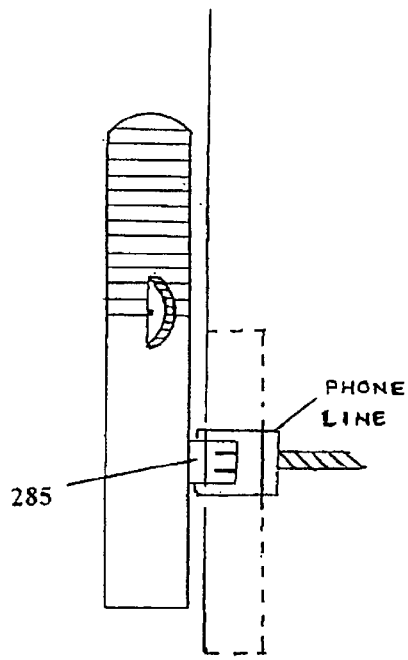
FIG. 5A shows a side view of a possible Remote that includes a possible phone jack connector prong shown in contact with a phone line outlet.

FIG. 5A shows an embodiment of a Remote that is powered and/or given access to a phone line (and/or answering machine) by connection to a phone line outlet or phone jack by a phone line, or phone jack connector prong 285.

The necessary components to enable a unit to be powered by and/or interact with a phone line are known in the art.

Figure 5B:
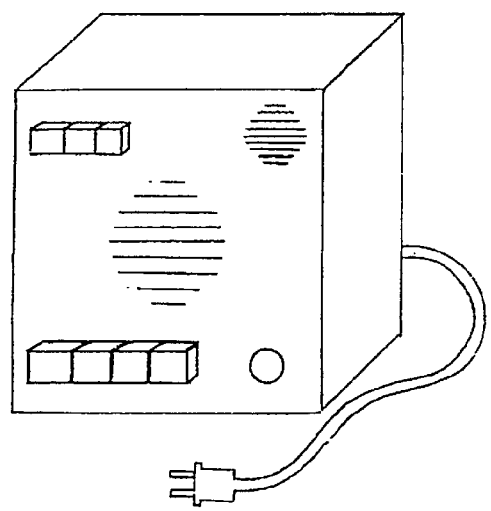
FIG. 5B shows a perspective view of a possible Remote and also includes a possible corded AC prong.

FIG. 5B shows a possible embodiment of a Remote and also possible inclusion of a corded AC prong 234.

Having a connector prong, plug, or phone connector prong allows for accessibility to a constant source of power. This power source can provide for actual operational usage of a Remote and, depending on embodiment, can also provide for recharging a possible rechargeable power supply or component 265 (FIG. 3A) located within a Remote.

Rechargeable components are already known in the art of such.

Having a rechargeable component within a Remote allows the Remote to be powered alternately between the main power source and the rechargeable component. This allows the user to remove the Remote from the AC or other power source, allowing the Remote to be powered by the rechargeable component, without forfeit of remote operational and/or screening abilities. Rechargeability also yields, or gives forth to, greater portability and use for the Remote, such that a Remote unit can be moved from place to place and it need not be limited to any stationary position for its source of power.

A rechargeable component may be of any kind, including electrical or digital. A rechargeable component may also include rechargeable battery(ies).

The use of a Remote that includes a connector prong for an AC (or other power) outlet can provide a Remote with, depending on embodiment, operating power and recharging power alternately, OR operating power and recharging power simultaneously so that operating usage can be indefinite even while recharging. By providing a connector prong, a Remote doesn't need recharging in any "home base unit", as a Remote with a connector prong can have available a constant source of convenient available power either by direct power source, including such as that of convenient AC outlets and/or phone jack outlets, and/or depending on embodiment: a rechargeable component or standard battery (ies) 263 (FIG. 3E). Thereby a Remote is more capable of being consistently usable and capable of constantly being in more convenient, accessible locations other than in some bulky, stationary "home base" recharger unit that may be located in some remote part of the user's home.

Just leaving the Remote plugged into or connected to its power source and ON enables the user to not have to physically be at the Remote during each telephone call in order to have to activate it, since by leaving it ON, it is already pre-activated. A Remote can be pre-activated (left ON) no matter how it is powered, including such as being plugged into its power source, powered by rechargeable component, or powered by standard battery(ies), enabling the user to not have to physically be at the Remote unit per phone call in order to have to activate it.

A Remote embodiment may include the ability to be powered by standard battery(ies) alone or alternately between main power source and standard battery(ies).

An embodiment of a Remote may include an adapter outlet 235 (FIG. 3D) for receiving power from an adapter source.

FIGS. 3B and 3D show examples of embodiments of possible Remotes that may include a clip member or belt clip 250. A clip member can allow for the ease of a Remote to be placed or attached upon different support structures including such as a belt, pocket, or edge, for easy transportation or placement location.

FIG. 3D shows a possible embodiment of a Remote with a possible inclusion of an aperture or notch 255 whereby a Remote may be hung from a fastener extending from a surface such as a wall.

Figure 7A:
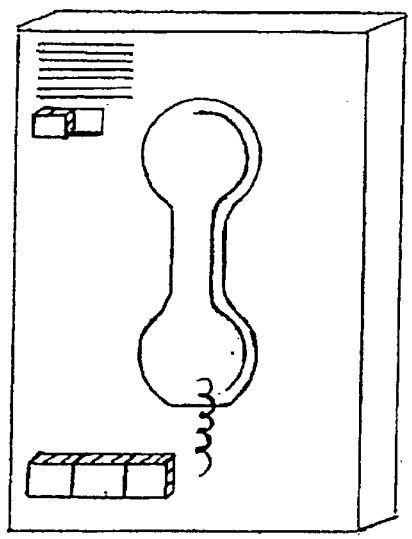
FIG. 7A shows possible embodiment of Remote included within telephone base/cradle.
Figure 7B:
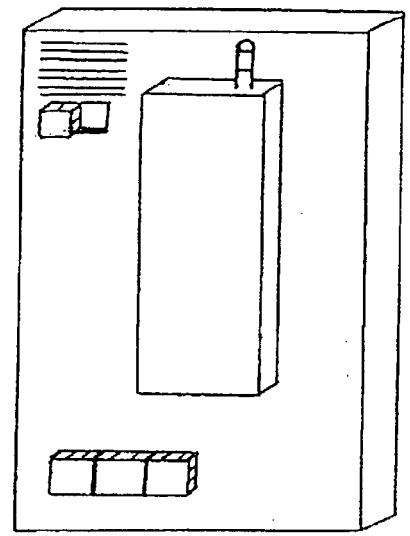
FIG. 7B shows possible embodiment of Remote included within phone recharger/base unit/cradle.

Another possible embodiment would be for any and/or all the function(s) and capabilities of a Remote to be housed within a telephone (of any kind) receiver's base unit, cradle, or recharger unit, (FIGS. 7A and 7B), and equipping these units with external loudspeaker, enabling these units with the capability to (externally) audibly screen incoming and/or recorded calls, and/or remotely operate an answering machine.

Figure 8:
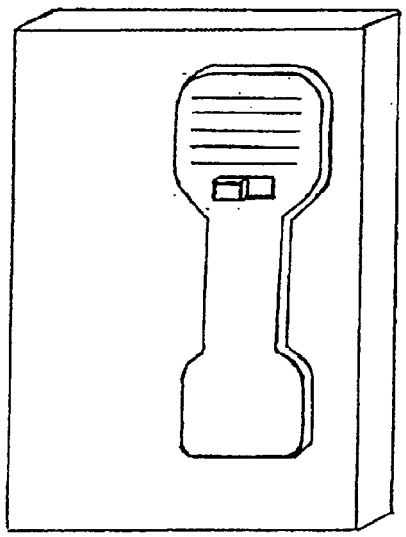
FIG. 8 shows possible embodiment of Remote included within a phone handset (receiver).

Another possible embodiment would be for any and/or all the functions and capabilities of a Remote to be housed within a telephone's receiver housing (any kind of telephone receiver, including cordless), for example, equipping the handset or receiver with an external audible receiving loud speaker, (separate from that of the normal audio receiver of the telephone), for audibly external screening use, so that the user may, for example, set his telephone handset down anywhere, including its cradle/base, and screen his calls, through the telephone handset or receiver, from across a room or (depending on embodiment, if the telephone receiver is cordless) carry the telephone handset with him and still have convenient access to screening his answering machine's calls through the telephone handset and, of course, as an added bonus, be near the telephone handset should he decide that he wants to talk to the caller (FIG. 8).

Figure 9:
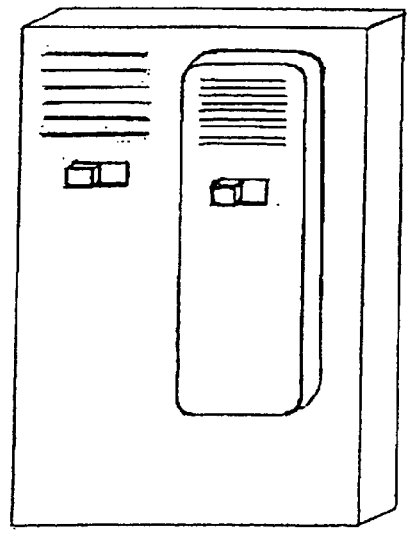
FIG. 9 shows possible embodiment of Remote included within both phone base and a phone handset (receiver).

Another possible embodiment would be for any and/or all the functions and capabilities of a Remote to be housed within both a telephone handset or receiver housing (of any type of telephone) and also the housing of its cradle, base, or recharger unit (FIG. 9).

Any and/or all functions and capabilities of a Remote may be housed within any type of unit, including such as a TV set (FIG. 10), any part of a computer set (FIG. 11), analog, digital or cellular phone (FIG. 12), car phone, etc.

Figure 13:
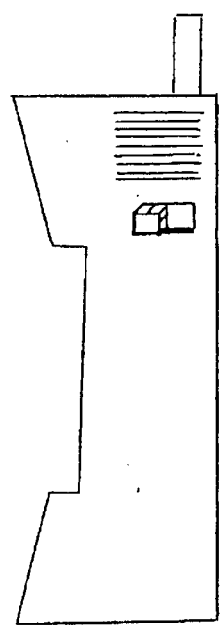
FIG. 13 shows a side view of a possible embodiment of Remote included within a cordless receiver showing possible audio speaker venting and also showing possible "On/Off" control.

An embodiment of a Remote that is included within the housing of a cordless receiver or any type of cordless phone may include audio speaker venting and also may include ON/OFF control in regards to screening ability (FIG. 13). The unit is able to externally audibly screen calls from an answering machine through the audio speaker venting.

Figure 14:
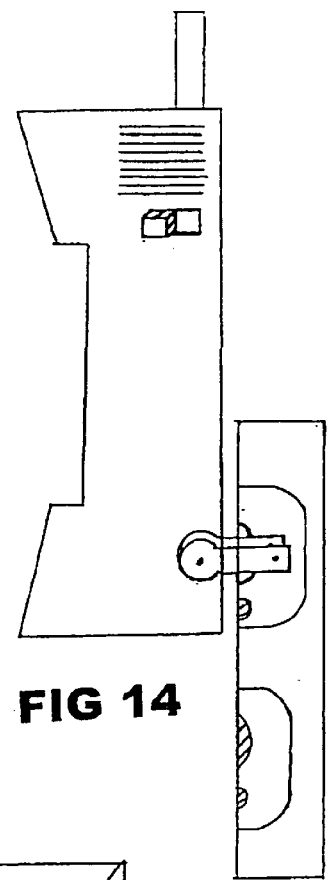
FIG. 14 shows a side view of a possible embodiment of Remote included within a cordless receiver showing possible AC prong, preferably collapsible, in contact with an AC outlet and also showing possible audio speaker venting and also showing "On/Off" control.

An embodiment of a Remote that is included within the housing of a cordless receiver or any type of cordless phone may include a possible AC prong (FIG. 14), preferably collapsible, shown here in contact with an AC outlet.

Figure 15:
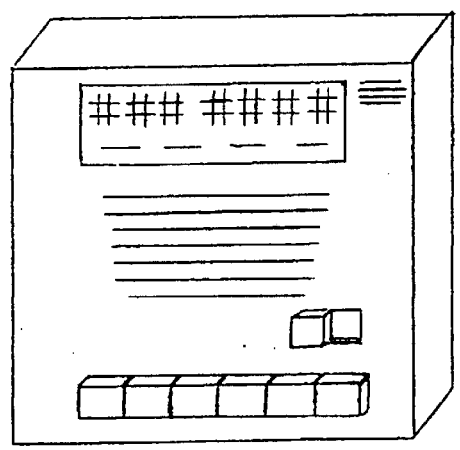
FIG. 15 shows a possible embodiment of a Remote that includes Caller ID.

A Remote may also include a Caller ID display or vice-versa. Any embodiment of a Remote can also incorporate or include a Caller ID display or function, example (FIG. 15). Conversely, the audible screening functions and/or other remote control functions of a Remote can also be incorporated into any embodiment of a Caller ID unit or any embodiment that includes Caller ID. And any Remote function or capability can be used in conjunction with any Caller ID function.

Any Remote embodiment may include an On/Off switch to control the externally audible screening loudspeaker (examples include: 200 (FIGS. 1D, 4B, 13) and 221 (FIG. 1C). The switch can be left in an "ON" mode at the user's option, leaving the screening capabilities "ON", which would enable the user to be able to hear and screen the incoming message or caller from a nearby area, such as across a room, without necessitating that a user have to get up and/or physically be at the phone receiver in order to have to depress or activate any type of code, button, or switch. Having an On switch that is able to stay "ON" and enables the screening ability to stay "ON", eliminates any need for such as that just mentioned.

In an embodiment where the Remote is portable, a Remote unit may include any number of possible attachment methods or sources.

Possible placement of a Remote unit could be anywhere, attached or otherwise, including being placed next to or on the side of any computer, or telephone, etc. for convenience.

These and other examples of Remote embodiments make for functioning remote units, devices, or capabilities which can include screening abilities and/or screening abilities with remote operational or remote control abilities, with which an answering machine has the ability to support and interact on such and each function.

The necessary components or circuitry for processing and carrying out the signals and commands between a main unit and its remote control counterpart unit(s) are known in the art of such. The necessary circuitry or components for processing and carrying out the signals and commands for remote operation capabilities between units is generally well known in the art. The necessary components or circuitry for receiving, represented in FIGS. 3A and 6B by a labeled rectangular box, is well known in the art. The necessary components or circuitry for transmitting, represented in FIGS. 4A and 6A by a labeled rectangular box, is well known in the art. The necessary components or circuitry for enabling two-way transmitting and receiving abilities between units are known in the art. The necessary components or circuitry to carry out wireless interaction between units are known in the art. The circuitry or components used in the present invention to allow for interaction between units is generally well known in the art. The necessary circuitry or components for processing and amplifying signals is generally well known in the art.

The features, functions, and capabilities of a Remote can be implemented and/or included into any embodiment, whether it is a self-contained Remote unit, or the features, functions, and/or capabilities of a Remote are housed within any other type of apparatus, unit, or device. The features, functions, and capabilities of a Remote may be embodied in any housing and in any number or combination.

"Answering machine" is used in this text to mean any answering machine, answering device, or message storage center designed to take and/or hold callers' messages.

An answering machine may be singularly by itself, may be combined with or into other functions or devices, and/or may be implemented into other devices.

An answering device may be any machine, device, service, center, or process that takes and/or holds callers' messages.

An answering machine may accommodate any variety of mode changes, signals, functions, and features. An answering machine may include being singularly by itself, may include a portable handset receiver, may be incorporated into any other type of unit, etc.

An embodiment of an answering machine may be of any form. It may be basic, such as the example illustrated in FIG. 6A, or may be of a more complicated nature and involve any additional features. The features, functions, and capabilities of an answering machine can be implemented and/or included into any embodiment, whether it be a self-contained unit, or the features, functions, and capabilities of an answering machine (in any number or combination) are housed within any other type of apparatus, machine, unit, or device, including such as those mentioned earlier for Remotes.

The following of some of many possible answering machine features are described and/or shown collectively in some drawings but are not restricted to such or any specific number, combination, or housing. They may be embodied alone, in many of any combinations, together in different combinations, and/or collectively together.

A possible embodiment of an answering machine may include multiple channels or frequencies that may, depending on embodiment, automatically scan and adjust to best frequency for use with Remotes, and/or may include a manipulable channel/frequency selector/switch, located on an answering machine 110 (FIG. 6B), for uses such as those described earlier for Remotes.

FIG. 6B shows a possible embodiment of an answering machine that includes such possible variable features such as a manipulable On/Off Remote-override switch 100. A Remote-override switch on an answering machine can provide an override to any power or remote control functions and/or screening functions to or from a Remote. Turning Off a Remote-override switch allows the user to shut down (turn Off) any interaction between an answering machine and Remote(s) without the user having to turn Off an answering machine's own On/Off control switch. The added control of a Remote-override feature thereby provides the user with ultimate control with concerns to his privacy in regards to any unauthorized screening or manipulation of his answering machine by or through a Remote. Manipulating a Remote-override switch that may be embodied on an answering machine does not interfere with the operable use of an answering machine's capabilities and functions.

FIG. 6B shows a possible embodiment of an answering machine that may include any number of indicator light LEDs (light emitting diodes), possibly including an LED 105 for such use as to indicate to the user that the capabilities to interact with a Remote are either On (example: lit) or Off (example: not lit). An LED could also, depending on embodiment, be used as an indicator, by being lit or by flashing, that someone is accessing an answering machine by way of Remote.

The interaction capabilities between an answering machine and Remote(s) are preferably such that a sizable range of distance is attainable. A sizeable range of distance leads to convenience and, e.g., helps to accommodate large homes, places of business, and/or possible outdoor placement of Remote(s).

The circuitry used in the present invention to allow for such interaction between units is generally well known in the art.

An embodiment of an answering machine may include an internal (or external) antenna 115 (FIGS. 2 and 6B) to enhance distance, and/or sound, and/or frequency.

A preferred embodiment of an answering machine would be for its audible transmitting capabilities to Remotes to be independent of an answering machine unit's own regular volume control. With highly sensitive microphone/transmitting signals, of which the circuitry components used for processing such are generally well known in the art of transmittance, an answering machine may pick up and transmit a caller's voice to a Remote even though the answering machine unit's own volume level may be turned down low or to its lowest setting with no ill effect on the audible transmission of sound to Remote(s), which, depending on embodiment, may also have their own independent volume control. This allows the user the option to keep the volume of the answering machine "low" or "off" in the room or area where it is located, allowing a user to have quietness in this room or area, yet still be able to keep audible transmitting abilities to the Remote(s). For example, if one person wants to take a nap in his bedroom and the answering machine happens to be located in that bedroom, he can turn down the volume of his answering machine so that he will not be awakened by any calls coming through the answering machine, still keeping the audible transmitting abilities so that others in the same household can still be able to screen their calls by way of Remote(s) that are placed or being kept in other rooms of the house.

An embodiment of an answering machine unit may include a Remote locator button/call switch 135 (FIG. 6B) which, when activated, will signal an alarm sound in the Remote(s) should the user be unable to locate the Remote. One or any possible LED in a Remote may also blink or light up in response to the activation of the Remote locator button. The user will then have no trouble finding the Remote(s) if they happen to have been misplaced or if he has forgotten where he placed it/them.

An answering machine may be manufactured to be programmable for use with Remotes or accept programmable Remotes. This could, in the case where a "code" is needed, or there is a predetermined matching "code" between (answering machine and Remotes) units already purchased, also accommodate for the purchase and use of Remotes or additional Remotes (that then can be programmed to match the "code" of the already purchased answering machine), at a later date than the original purchase of the answering machine.

Answering machines may be manufactured in different ways to work or interact with Remotes, including: being manipulable, and/or being pre-manufactured to work with Remote, and/or being programmable to work with Remotes.

The necessary circuitry to enable these embodiments is generally well known in the art.

Figure 16:
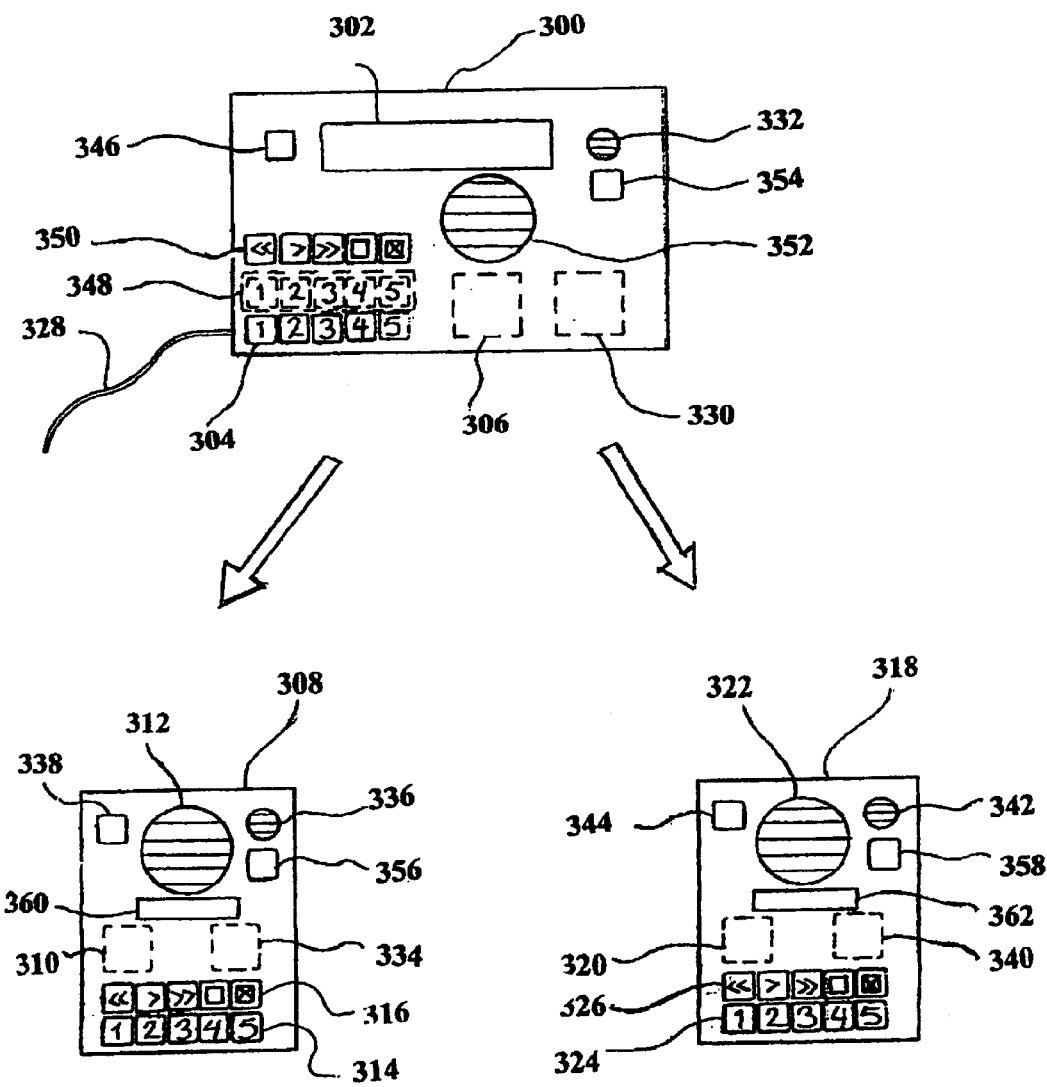
FIG. 16 shows a remote call screening system including an answering machine with multiple "mailboxes" for storing voice messages and multiple Remote units for monitoring incoming messages and for replaying previously recorded messages.

FIG. 16 shows a remote call screening system including an answering machine or system 300 with multiple "mailboxes" 348 for storing messages and multiple Remote units 308, 318 for monitoring incoming messages and for replaying previously recorded messages. This embodiment of the present invention is particularly useful for households or offices with multiple users of the remote call screening system. In addition, it facilitates the use of one remote call screening system for multiple uses at one location, for example for using one telephone system for screening both home office and household phone calls. Calls forwarded from other locations can also be screened using the same remote call screening device. The features of this embodiment of the invention may be combined with any of the features of any of the embodiments previously described. The answering machine 300 connects to an incoming telephone line 328, which may be configured to include a single telephone line, two telephone lines or multiple telephone lines. The answering machine 300 may be connected with one or more telephones (not shown), either directly or using wireless connections. Alternatively, one or more standard or cordless telephones may be built into the answering machine 300 and/or into the Remote units 308, 318.

The answering machine 300 is configured with multiple "mailboxes" 348 for receiving and storing voice messages. The multiple "mailboxes" 348 may be accomplished by segregating recorded messages within a recording or storage device, such as an analog or digital electronic storage device, for example a random access memory (RAM), recordable CD ROM or DVD, or flash memory device. Alternatively, multiple "mailboxes" 348 may be implemented using tape recording devices, such as by using a separate cassette or microcassette recorder for each of the "mailboxes" 348. Any number of "mailboxes" 348 may be implemented. In the exemplary embodiment of FIG. 16, the answering machine 300 is shown with five "mailboxes" 348. Preferably, the answering machine 300 includes operational controls 350 for operating the answering machine and a speaker 352 for listening to recorded messages as well as for monitoring incoming calls. In addition, the answering machine 300 includes a microphone 332 and a record button 354 for recording a greeting, outgoing message or memo in the answering machine 300. The microphone 332 may also be used for intercom communications with the Remote units.

The answering machine 300 automatically answers each incoming call. A prerecorded greeting or outgoing message on the answering machine 300 directs callers to select their choice of "mailboxes" 348 by indicating a number or a name using the keypad of their phone or a computer or other device or by voice commands. The answering machine 300 then directs the incoming call to the selected "mailbox" 348. In addition, a separate prerecorded greeting or outgoing message may be associated with each of the "mailboxes" 348. The "mailboxes" 348 may each be assigned to a different user or to a different purpose, such as to separate household phone calls from office or business phone calls. For this description, the multiple "mailboxes" 348 will be referred to nominally as "mailbox 1", "mailbox 2", etc. Preferably, the answering machine 300 includes a visual display, such as an LED display 302, to indicate the operating status of the answering machine 300 and how many messages are recorded in each "mailbox" 348, as well as to show which "mailbox" the incoming call is being routed to. It may also identify the intended recipient by name or other designation. In addition, the answering machine 300 may include a caller identification feature, which may shown the caller's phone number and/or name or organization on the visual display 302.

Simultaneously, as the incoming call is being recorded, a transmitter 306 in the answering machine 300 transmits the incoming call to one or more Remote units. (Additional transmitters 306 may be included to allow simultaneous transmission of more than one incoming message when the answering machine 300 is configured to operate with multiple incoming telephone lines 328 or with multiple calls multiplexed on a single incoming phone line or fiberoptic cable. Optionally, multiple receivers 330 may be included in the answering machine 300 to allow simultaneous reception of transmissions from multiple Remote units. The system can also be configured to screen incoming calls while engaged on another telephone call, for example in order to prioritize the calls. In addition, the system can be configured to screen calls while the line is otherwise engaged, such as while the line is being occupied by an internet connection. This can provide an audible call waiting function, which can supplement a caller identification feature.) For illustrative purposes, the system of FIG. 16 is shown with a first Remote unit 308 and a second Remote unit 318. The system may include multiple additional Remote units for multiple users. Each of the Remote units 308, 318 has a receiver 310, 320, which is configured to receive messages on one or more selected channels or frequencies. Optionally, multiple receivers 310 may be included in the Remote units 308, 318 to allow simultaneous reception of transmissions from multiple answering machines. Preferably, each Remote unit 308, 318 includes remote channel selector switches 314, 324 that allows each of the users to select which of the "mailboxes" 348 their Remote unit will monitor (e.g. "mailbox 1", "mailbox 2", "mailboxes 1 and 2", etc.) Alternatively or additionally the answering machine 300 may include answering machine channel selector switches 304 or other means for selecting or programming which Remote unit will receive incoming calls for which "mailbox" on the answering machine 300. Preferably, the answering machine 300 also includes a mode selector switch 346, which may include a remote function ON/OFF switch and a remote-override function for preventing transmission of incoming messages to one or more of the Remote units 308, 318 and/or from one or more of the "mailboxes".

Each of the Remote units 308, 318 is configured with a speaker 312, 322 for audibly emitting each incoming call as it is being recorded by the answering machine 300. This allows each user to monitor and screen incoming calls to the selected "mailboxes" 348 as they are being received. Optionally, the Remote units may also include a visual display 360, 362 for displaying such information as a caller identification feature, the operating mode, how many messages are in the selected "mailboxes" 348, which "mailbox" the incoming call is being routed to, etc. If one of the users chooses to answer an incoming call, he or she may interrupt the answering machine 300 by picking up a telephone (not shown) on the answering machine 300, on one of the Remote units 308, 318 or connected to the incoming telephone line 328. Other devices, e.g. a computer or a web or internet interface device, may also be used to answer an incoming call or message and interrupt the answering machine 300.

Optionally, one or more of the Remote units 308, 318 may include remote operational controls 316, 326 for remotely operating the answering machine 300, to play back recorded messages from one or more of the "mailboxes" 348 or to change its operating modes. In addition, the Remote units 308, 318 may also include a microphone 336, 342 and recording switch 356, 358 to record messages in one of the "mailboxes" 348, to record memos or outgoing messages, and/or for intercom communications with the answering machine 300 or another Remote unit, etc. In such case, the Remote units 308, 318 will each be configured to include a transmitter 334, 340 and the answering machine 300 will include a receiver 330 to permit two-way communication between the Remote units 308, 318 and the answering machine 300. Preferably, each of the Remote units 308, 318 also includes a mode selector switch 338, 344, for selecting the call screening function between OFF, ON and ACTIVE ON modes. The mode selector switch 338, 344 may also includes a remote-override function for preventing transmission of incoming messages to one or more of the Remote units 308, 318. Alternatively, the remote-override function may be implemented with a separate switch. Additional controls may include a power switch, volume control, etc.

In an alternative embodiment of the system, each of the Remote units may be preconfigured to receive incoming and recorded messages only on one or more preselected channels or frequencies or otherwise programmed to receive incoming and recorded messages from and/or to transmit to one or more preselected "mailboxes". In another alternative embodiment of the system, some of the Remote units may be preconfigured to receive incoming and recorded messages only from one or more preselected "mailboxes" and one or more "master" Remote units may be configured to allow a parent, employer or system administrator to monitor any and all of the "mailboxes" 348. Each of the "mailboxes" may include an access code or personal identification number for security and to prevent unauthorized listening to messages in individual "mailboxes" from the Remote units and/or the answering machine. If desired, the "master" Remote unit may include a master remote-override switch or a "privacy" control to prevent sensitive messages from being monitored or played back by some or all Remote units. The remote-override switches may be activated ahead of time to prevent all calls from being monitored on one or more channels, or it may be activated by the user at the moment privacy is desired.

The system of FIG. 16 may be made expandable to accommodate additional "mailboxes" and Remote units. For security, the answering machine and each of the Remote units may be provided with a "family code" so that only devices with a matching "family code" will operate with them. When new or other Remote units are added to the system, they may be programmed with the matching "family code" so that they will operate with the rest of the system.

FIG 17 shows an embodiment of the present invention which is in the form of an integrated device 400 that combines the functions of a cordless telephone receiver with those of an answering machine and call screening Remote unit. The integrated device 400 includes a handset 402 and a base unit 404. FIG. 18 shows a rear view of the handset 402 of FIG. 17. The base unit 404 includes a telephone line 406, a transmitter 410, a receiver 412 and an antenna 416 for receiving incoming telephone calls and communicating them to the handset 402. Preferably, the base unit 404 also includes a power cord 408, a transformer 418 and an electrical connector 414 for recharging the handset 402.

The handset 402 includes a speaker 420, a loudspeaker 421 a microphone 422, a numeric keypad 424, a transmitter 428, a receiver 438 and an antenna 436 for functioning as a cordless telephone and communicating with the base unit 404. In addition, the handset 402 includes a telephone answering device 440 that includes a recording device, such as a flash memory or similar components for recording incoming and outgoing messages. A rechargeable battery 432 powers the handset. A power connector 444 connects the battery 432 to the transformer 418 for recharging when the handset 402 is rested on the base unit 404. Alternatively, the transformer 418 and a retractable power plug 442 or other power connector can be integrated with the battery 432 in the handset 402. Operational controls 430 are provided for operating the telephone answering device 440 to play back recorded messages and all answering machine capabilities. Optionally, the telephone answering device 440 may include multiple "mailboxes" for storing incoming messages, as described above. The telephone answering device 440 also includes a mode selector switch 434, for selecting the call screening function between OFF, ON and ACTIVE ON modes and the speaker function between loudspeaker and privacy screening modes. When operating in loudspeaker screening mode, the incoming call is amplified and audibly emitted through loudspeaker 421 so that it can be heard from a distance. When operating in privacy screening mode, the incoming call is routed to speaker 420 so that only the user can hear the incoming call by placing an ear close to the speaker 420. Alternatively, one speaker 420 can be used for both loudspeaker and privacy modes by amplifying the incoming call when operating in loudspeaker mode. The mode selector switch 434 may also include a screening-override function for preventing unauthorized screening of incoming or recorded messages. Preferably, the handset 402 includes a visual display 426 for displaying such information as a caller identification feature, the operating mode, how many messages are recorded in the telephone answering device 440 and/or within each of the "mailboxes", alphanumeric messages, etc. When the call screening function is set in ACTIVE ON mode and the speaker 420 is set in loudspeaker mode, the user can monitor all incoming calls in a hands-free manner. If the user chooses to answer the incoming call, the telephone answering device 440 can be interrupted by switching on the telephone function to answer the call. Optionally, the handset 402 may have a speakerphone function that can be used for hands-free calling. In an alternative embodiment, the handset 402 may operate with cellular phone technology, eliminating the need for the base unit 404. Alternate positions for the mode selector switch 434', visual display 426' and operational controls 430' are shown in FIG. 18.

Figure 19C:
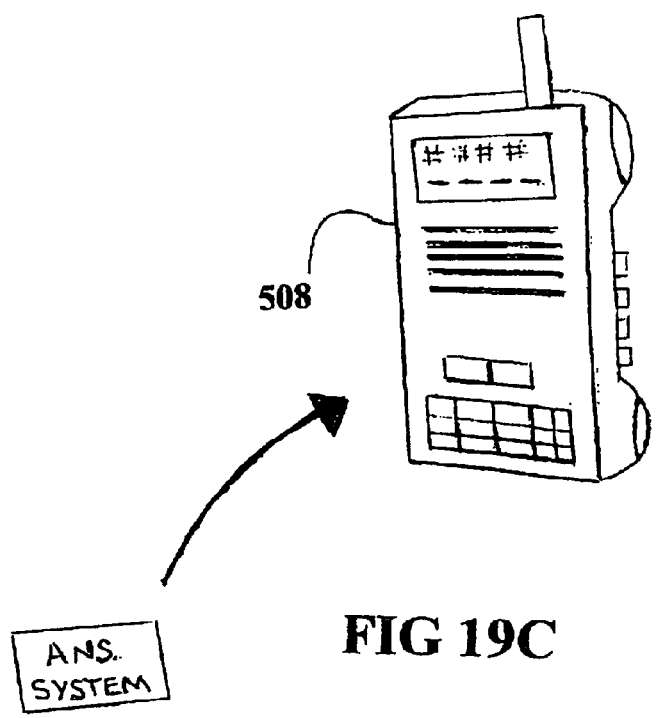
Figure 19D:
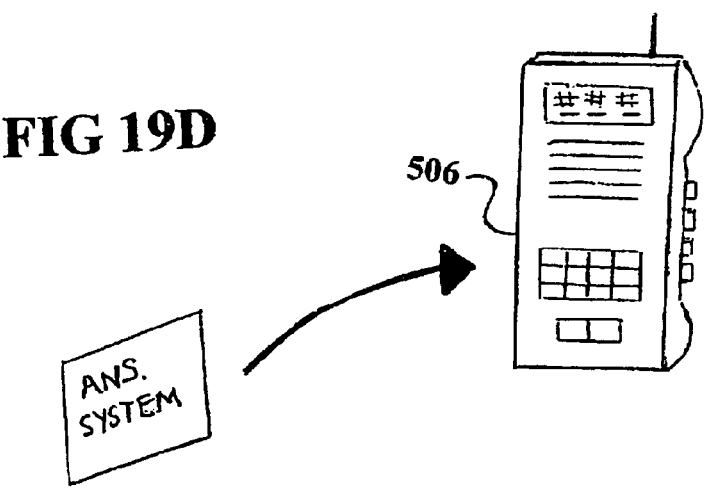
Figure 19E:
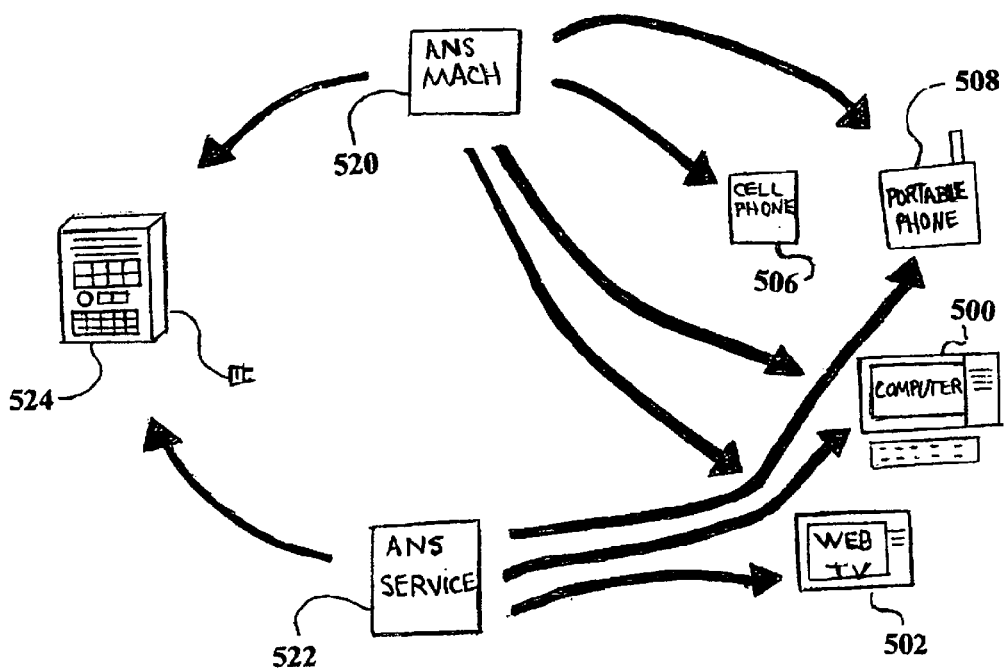

FIGS. 19A–19F show pictorial schematics of various embodiments and systems of a call screening device according to the present invention. FIG. 19A illustrates a call screening system with a device 500, such as a computer, an internet interface device or WEB TV device, with an internal answering system 524 for telephone messages, voice mail and/or e-mail and an outwardly audible screening device. Text messages, such as e-mail or alphanumeric pager messages, may be converted to speech to be audibly emitted by the call screening system with the aid of a speech synthesizer. This call screening system may be used alone or in connection with other remote screening devices. (Systems of a call screening device including such as FIG. 19A may also include) With or without "outside" buttons to control: ex. on/off, rewind, forward, record, without having to operate by keyboard or mouse. Being able to/and/or leaving screening switch "on" can enable a user to screen (ex. outwardly audible) his computer's "live" incoming calls that are concurrently being recorded onto the computer's answering system. The user could "listen in" on calls being currently left (which he otherwise couldn't before) and then decide to take a live caller. As illustrated in FIG. 19B, the device 500 may interface via direct or wireless connections with other devices, such as another computer or WEB TV device 502, a portable computer or personal digital assistant 504, such as a PALM PILOT, a cell phone 506, a cordless phone 508, and/or a household appliance 510, such as a refrigerator, which is integrated with or otherwise functions as a remote call screening device. A computer is capable of having a built in phone/and answering system in it. The answering system (built in) would be able to transmit (however way) to whatever is the remote screening system. (ex, a portable phone, a cell phone, web TV) and it could do this wirelessly, and/or through AC, and/or DSL, and/or Cable. The remote screening systems should have the ability to receive screen (whatever way) built into their system. This same can also be accomplished with the "starting point" being an answering service or device. (Systems of a call screening device including such as FIG. B may also include) (There may be) a switch to pick which Remote/Appliance will screen. FIG. 19C shows a cordless phone 508 integrated with a remote call screening device. (Systems of a call screening device including such FIG. 19C) may also include screening switch and/or remote operational buttons. FIG. 19D shows a cell phone 506 integrated with a remote call screening device. (Systems of a call screening device including such as FIG. 19D) may also include screening switch and/or remote operational buttons. FIG. 19E shows another variant of the call screening system with an answering machine 520 and/or an answering service or voice mail service 522, which may interface via direct or wireless connections with a remote call screening device 524 and/or other devices, such as a computer 500, WEB TV device 502, a cell phone 506 and/or a cordless phone 508, which is integrated with or otherwise functions as a remote call screening device. (Systems of a call screening device including such as FIG. 19E) may also include leaving voice message, then the computer types it out, (and) can (also) translate back to voice to let it have outwardly audible screening also. Sometimes (an) email (can) have an unpredictable delay, but that's ok, (as the system of a call screening device can still) have the "hear it" (outwardly audible) ability.

Figure 19F:
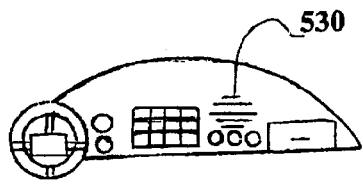

Any of the embodiments of the present invention described herein can also be adapted for audibly emitting and screening other types of messages, for example voice mail, internet or e-mail voice mail, instant messages, pager messages and e-mail. These messages may be received through a regular telephone line or other sources, such as the Internet, World Wide Web, cellular or satellite telephone or data transmissions, VOIP (voice over internet protocol), DSL (digital subscriber lines), television cable, etc. Text messages, such as e-mail, faxes or alphanumeric pager messages, may be converted to speech to be audibly emitted and screened by the Remote unit or a speaker on the answering means with the aid of a speech synthesizer. One application that can benefit from the features of the present invention is mobile computing. New on-board vehicle navigation, communication and infotainment systems, such as ONSTAR or VIRTUAL ADVISOR, have been developed that allow communication from cars and other vehicles. As illustrated in FIG. 19F, a remote call screening device 530 can be combined with the on-board communication system, to audibly emit incoming and recorded telephone messages, voice mail, e-mail, pager messages and the like. Hands-free voice activated telephone service and internet connections may also be incorporated for use in combination with the other features of the invention. With hands-free operation and speech synthesis of text messages, the remote call screening device 530 facilitates communication and helps to avoid driver distraction.

Although the present invention has been described using two-way radio communication between the answering machine or base unit and the Remote units, other wireless communications methods can also be used. For example, infrared wireless connections can be used between the answering machine or base unit and the Remote units. Likewise, other wireless connection protocols, such as the Bluetooth communication protocol, may be used. Alternatively, a house or building's electrical wiring system can also be used for communication between the answering machine and the Remote units and other appliances. Connections between units and/or with the internet may be implemented using HOMEPLUG power line networking. The answering machine and each of the Remote units can connect to the wiring system through their power cords for receiving power, as well as for sending and receiving communication signals. One way this can be implemented is using a high-pass filter in each device to separate the communication signals from the alternating current power signal. Using this system, a Remote unit can be plugged into an electrical outlet anywhere in the building for connection to the answering machine. Other electronic components, such as a computer for receiving e-mail and performing speech synthesis, can be connected to the answering machine and Remote units through the wiring system in a similar way. This system offers flexibility, but avoids potential security issues that could arise using radio transmissions which can be monitored from outside of the building.

Conclusion, Ramifications and Scope

Thus the reader will see that Remotes, having appropriate remote operating and/or receiving, and/or transmitting, components or circuitry, can interact with an answering machine having appropriate components or circuitry, allowing interaction and response between answering machine and Remotes and/or Remote capabilities, providing a convenient answering machine remote control and/or screening device that is not limited to a telephone or any single or specific type of telephone. Nor are Remotes limited to an area such as a "home base unit" for its power/recharging sources. The invention can provide for convenience, portability, and economy, and is simple such that it can be used by persons of almost any age.

It will be evident to those skilled in the art that a great many variants of the foregoing invention are possible.

From above descriptions, it should be apparent that the present invention is adapted, and can be adapted, to be used in a variety of locations and such that the Remotes may remain free-standing, be rested on a horizontal surface, supported from a vertical surface, placed in a supporting structure, housed within and incorporated within other units, etc.

The invention has the advantages in that it, depending on embodiment:

Provides an answering machine outwardly-audible remote screening unit or device. Of that which is not limited to the use of a telephone, any certain or specific type of telephone, or any limited number of telephones. The screening functions are made available to immediately relay incoming calls outwardly audible to the user via a Remote unit or device which allows the user to audibly screen his calls away from his answering machine, such as from another room or area. Such that the user can remotely listen to and screen incoming calls in any and more than one remote area, while caller is still on the line. Depending on embodiment, the user may have the capability to transport and/or vary placement of Remotes and/or the option to have multiple placed Remotes in many locales.

Provides an answering machine remote operational device and outwardly audible remote screening device of that which is not limited to the use of a telephone, any certain or specific type of telephone, or any limited number of telephones. Providing mechanisms to allow outwardly audible remote screening and the remote operation of an answering machine, via a Remote unit or device, accessing and allowing such possible functions as including, e.g.; on/off, stop, play (listen), replay, forward, record, etc. Providing remote access to an answering machine that possesses appropriate circuitry or components that allows for such remote functions to be carried out. The circuitry used for such operations is already known in the art. Various operational functions of an answering machine could be remotely carried out and made available to the user through a Remote unit or device. For example, the play or listen function on a Remote would access and play back recorded messages from an answering machine through the Remote outwardly audibly. The Remote unit or device with remote control abilities would also have the ability to remotely screen incoming calls outwardly audibly, immediately relaying incoming calls while a caller is still on the line. A Remote is available for the user to use in any, and more than one, remote area at a time, which allows the user the access to the functions of his answering machine, away from the answering machine itself, such as from another room or area, by way of Remote, and also allows the outwardly audible screening of incoming calls to the user, away from his answering machine. Depending on embodiment, the user may have the capability to transport and/or vary placement of Remotes and/or the option to have multiple placed Remotes in many locales.

Provides an answering machine outwardly audible remote screening unit or device and/or remote operational and outwardly audible remote screening unit or device that, for example, in a household or office where more than one person resides or works, a visual LCD screen on a Caller ID unit cannot provide for the fact that the different family members, housemates, or co-workers cannot possibly know all of the other family members' or co-workers' possible assortment of selected Caller ID telephone numbers or who it is exactly that is calling from those numbers.

Provides an answering machine outwardly audible remote screening unit or device and/or remote operational and outwardly audible remote screening unit or device that can be outwardly audibly heard from the Remote unit or device, across a room or distant area, without necessitating the user to search and locate a receiver in order to put it up to his ear to hear and screen the calls as one would have to do with such as that of the Scordato patent. Nor does the user of my invention have to get up in order to be able to get close enough to read a phone number displayed on an LCD screen in order to screen his phone calls, as one would have to do with a Caller ID unit. Nor does the user have to get up to go to the room where his answering machine is in order to be able to hear the calls in order to screen them.

Provides an answering machine outwardly audible remote screening unit or device and/or remote operational and outwardly audible remote screening unit or device that can be used by, for example, the whole family, roommates, etc. who can all listen or screen calls simultaneously, away from an actual answering machine unit, while waiting for their own individual prospective callers, because a Remote is outwardly audible from a distance. There is no need to put a telephone receiver to one single user's ear in order to hear and screen a caller, as one would have to do with the Scordato patent. Nor does one have to be in eyesight of an LCD screen, as one would have to be as such with a Caller ID unit. By the ability to hear and identify whom the incoming call is for, this provides not only for the obvious telephone screening uses but this can also eliminate a user from having to write down a message from a caller after picking up the telephone and finding that the call is not for him but for someone else, when otherwise, having known that the call wasn't for him, the user would have just let the answering machine pick up the caller's message.

By providing that the screening ability of a Remote unit or device (the sound coming from a Remote) can be audible a distance from the Remote itself, and also providing that a Remote can be left in an "On" mode, a Remote unit is capable of being used as a call screener "hands-free"; without the user having to be physically at a Remote in order to [but] put the receiver up to his ear in order to hear and then screen the call to see if the call is for him, and without the user having to turn "On" the Remote per incoming call.

Provides an answering machine outwardly audible remote screening unit or device and/or remote operational and outwardly audible remote screening unit or device with the ability to outwardly audibly identify and hear the incoming caller and, importantly, by hearing the content of the incoming message, the user will learn the purpose of the incoming call, which can alert the user who would otherwise not pick up the phone to such as; an important call, an awaited call, a call that needs to be returned right away, or even an urgent or emergency call, etc. With a Remote, this screening process can be done "hands-free" (as stated above) and can also be done without the user having to stay transfixed to where his answering machine is in order to selectively screen calls when he does not want to bother picking up every phone call. The user can screen his calls from a remote area, a distance away from a Remote unit or device, and away from his answering machine unit, at his leisure, and be aware, by screening, of any important call that might happen to come through. Should the user then opt to pick up the telephone at any time, he may.

Provides an answering machine outwardly audible remote screening unit or device and/or remote operational and outwardly audible remote screening unit or device that is able to stay in an active (On) mode without necessitating a user to have to actively get up, search, and locate a telephone receiver in order to activate or depress a signal button or control switch as one would have to do with the Scordato patent. By eliminating this burdening step, it makes life a little more convenient, saving time and labor.

Can provide an answering machine outwardly audible remote screening unit or device and/or remote operational and outwardly audible remote screening unit or device that does not require a manufacturer predetermined matching code between an answering machine and Remote(s), as having a predetermined matching code can, depending on embodiment, limit the purchasing of additional Remotes at a later date.

Can provide an answering machine outwardly audible remote screening unit or device and/or remote operational and outwardly audible remote screening unit or device with a predetermined matching code between an answering machine and Remote(s), giving a manufacturer the option to include any multiple of corresponding coded Remotes in packaging. Thereby eliminating concerns of purchasing additional Remotes at a later date.

Can provide an answering machine outwardly audible remote screening unit or device and/or remote operational and outwardly audible remote screening unit or device, and/or an answering machine with: channel/frequency selection, automated and/or manipulable for:

a. best reception; and/or b. to avoid possible interference;

c. so that other persons in, e.g. the same household, may own and operate their own individual answering machine units and Remote units or devices that can set to different channels so as to avoid interference and also allows for possible interchanging of units (as described earlier).

Provides an answering machine outwardly audible remote screening unit or device and/or remote operational and outwardly audible remote screening unit or device that can plug directly into a power outlet for a constant source of power.

Provides an answering machine outwardly audible remote screening unit or device and/or remote operational and outwardly audible remote screening unit or device that does not need recharging in a "home base unit", as does the Scordato telephone receiver/screener which needs recharging in the cradle of its "home base unit". Therefore it follows that a Remote is then capable of being placed in more convenient, remote locations, or transported to several locations, as its recharging abilities are not tied to where a "home base unit" resides.

Can provide an answering machine outwardly audible remote screening unit or device and/or remote operational and outwardly audible remote screening unit or device that has the capacity to recharge and yet simultaneously still maintain operating power so as to still be able to send, process, and receive transmitted signals so that screening and/or remote operation of an answering machine's functions can be indefinite. This means, that even while a Remote is recharging in or at a power source, it is still capable of being used, for example, as a screener, as the power source still enables the functions of a Remote to continue. Therefore the user does not have to give up any screening abilities when a Remote unit may be recharging. The same would be true of any remote control abilities of a Remote.

Can provide an answering machine with a Remote-overriding control switch, located on an answering machine, which can override a Remote's capabilities, providing the user with ultimate control over any Remote(s) in regard to his privacy. This Remote-overriding control switch is separate from that of a power control switch of an answering machine in such that turning Off or On the Remote-overriding switch does not interfere with an answering machine's power and functions.

Can provide an answering machine outwardly audible remote screening unit or device and/or remote operational and outwardly audible remote screening unit or device with more convenience and ease of portability with such possible embodiments of: small size, direct plug in, screening and/or remote capabilities available while simultaneously recharging, no need for "home base unit" for recharging, collapsible prong, clip member, aperture, etc.

Provides for greater economy, convenience, accessibility, versatility, and inconspicuous placement ability for reasons such as those stated above.

Additionally, my invention realizes an existing need and an almost untapped market. What is on the market is relatively unknown, uneconomical, or not practical, and does not provide for all the advantages that exist in my invention.

Since portable phones can be a relatively expensive purchase, my invention is more economical than the Scordato patent, as there is no necessity or requirement for the purchase of a cordless phone, nor any phone, for that matter. All that is needed is an answering machine, which most people have, especially people who want the ability to screen their phone calls. A user would be able to use my invention with any phone, or any combination of phones, that he may already have, as the type of phone used does not matter. Also, by having an embodiment option that makes possible the use and/or inclusion of more than one Remote per answering machine allows for greater economy and broader usage. There is no need to buy additional telephone receivers or additional telephone answering machine-telephone receiver/screener systems (as with the Scordato patent), which can be expensive, to broaden the area of remote screening placement.

Also, there is no need to purchase additional telephone services from a telephone company, as there is for the use of a Caller ID unit.

My invention is also more cost effective for manufacturers as:

Since it is less complicated, a Remote would be cheaper to build, and in turn, should be less expensive than the Scordato invention for consumers to buy. Less expensive means more affordability for the consumer, which, in theory, equals more chance that consumers will purchase.

Most households contain at least one answering machine, especially by people who want the ability to screen calls. Most answering machines are replaced every few years. Therefore, my invention should be easy to sell not only to consumers, but to manufacturers, as well.

Since, depending on embodiment, more than one Remote per answering machine may be purchased by consumers, this is also another potential selling point to/and for manufactures.

My invention could be made, sold, and utilized for many years throughout a changing technology without becoming outmoded or obsolete. And as stated earlier, my invention (either part: Remote or answering machine), its functions and capabilities, can be implemented and/or included into, with, or within any housing or device. The idea and purpose to audibly, remotely screen calls from an answering device or service and/or have remote operational access to an answering device, without the use of any type of phone, can be made to fit any change in technology. Hence, my invention has a long life cycle potential, which would justify capital expenditures for tooling and advertising.

My invention and its capabilities can be implemented or incorporated into any type of device or unit (as stated above), including and besides that of self-contained Remote units and/or self-contained answering machine units. This versatility would not only greatly expand the variety of ways and locations to use my invention but it would also accommodate change in technologies.

A surprising 37 percent of all Americans screen their phone calls through their answering machines, refusing to pick up the receiver until they hear who's calling. This statistic, in itself, is enough of a selling point to manufacturers and, obviously, consumers.

While my above description contains many specificities, these should not be construed as limitations on the scope of the invention, but rather as exemplifications of some of the preferred embodiments thereof. Many other variations are possible, including, for example:

Remotes can be of various types, including:
  Remotes can be of the kind where it is receiver only;
  Remotes can be the kind where it also includes remote control operational capabilities;
  Remotes can be of the kind where it also includes a recording ability;
  Remotes can be of the kind where it has remote control capabilities and also remote recording abilities;

Remotes can be of the kind where it has remote control capabilities, remote screening capabilities, and also remote recording abilities; or include any combination thereof;

Remote units can have other, or any, shapes and/or sizes;

any or all functions and capabilities of a Remote may be incorporated into other various units or devices;

any or all functions and capabilities of an answering device or answering machine may be incorporated into other various units or devices;

the functions and capabilities of a Remote may be incorporated into a watch or timepiece;

the functions and capabilities of a Remote may accompany various other units or devices;

the functions and capabilities of a Remote may be made to interact with various other devices or units;

the functions and capabilities of a Remote may be made to work or interact with voice mail, voice mail centers, message centers, or call centers, such as that available through phone services;

locations of any features, including such as any LED's, function controls, outlets, prongs, clips, etc. are variable;

an On/Off control switch need not be included on either/ or both an answering machine and/or a Remote;

there need not be a Remote-overriding control switch on an answering machine;

there need not be a volume control on a Remote;

On/Off and volume controls may be made combined into one control on a Remote;

a separate volume control on an answering machine may be added to control a Remote's audible level;

indicator LED lights can be added or eliminated, located anywhere, colored differently or the same, blink and/or have steady light;

a single LED light can serve for single or multiple purposes;

shape, including size, of either Remotes and/or answering machines can be altered;

antennas in/on either Remotes and/or answering machines need not be included;

rechargeability component in Remote need not be included;

the transmitter, receiver, answering machine and/or Remote may be controlled and/or operated by separate sources, such as electronic or computer hardware and/or software, and/or run off separate power sources;

Remotes may be run off of various types of power sources, including such as: rechargeable batteries, standard batteries, a recharging component, a recharging unit, internal charger, external charger, AC current, phone lines, etc. alone, alternately, or in combination;

Remotes may be recharged in a charging base;

channel and/or frequency selection, either manipulable or automatic, on either Remote and/or answering machine need not be included;

channel selections on either Remote and/or answering machine may be added;

a Remote may be corded;

a connector prong can be attached to a corded extension;

a corded extension may be retractable;

a connector prong can be stationary (fixed) or moveable (such as retractable or collapsible);

a collapsible connector prong need not be embodied;

a connector prong need not be embodied;

a phone line may be corded;

there may be connectors or inlets on a Remote to connect phones lines to a Remote;

an embodiment of a clip member may include a clip member's upper portion to be slightly bulging outward;

an outward bulge in a clip member together with a possible outward bulge or pad/stop on a Remote can possibly serve to keep a Remote unit substantially parallel to an engaging surface such as a table top or a wall outlet. An outward bulge or pad/stop may also be used as protection for or from engaging surfaces and/or for better protection from an outlet source. A pad/stop may also possibly provide a stopping means for a folding or moveable connector prong;

a space between the upper portion of a clip member and the back of a Remote unit can allow for varying thicknesses of different support structures;

an embodiment of a Remote unit may possibly include a recessed area that may help accommodate a lower portion of a possible clip member which could allow for a more secure adherence or attachment to support structures;

recessed areas for such things including a connector prong need not be embodied;

a clip member need not be embodied;

outwardly bulging portion of a possible clip member need not be embodied;

spacing between possible clip member and a Remote need not be embodied;

aperture need not be embodied;

a Remote or a clip member may include a magnetized material so that a Remote may be conveniently attached to a metal surface, including such as that of a refrigerator door;

a surrounding audio venting on Remote need not be embodied;

a two-way system can be incorporated so that an intercom ability or system exists between a Remote and another unit (such as that of an answering machine);

any embodiment of a Remote, or any unit or device that embodies, houses, or includes Remote capabilities and functions may also include remote operational abilities and access to an answering machine, and that remote operational access may also include the ability to externally audibly screen pre-recorded messages already left on an answering machine;

the Remote interactive capabilities of an answering machine can be made to run off rechargeable battery (ies); rechargeable battery(ies) in an answering machine that enable interaction capabilities with a Remote can be capable of being recharged by the same energy source as the answering machine's power supply, thereby eliminating the need for frequent battery replacement or the need for separate battery recharging;

the Remote interactive capabilities of an answering machine can be made to run off standard battery(ies);

a Remote need not be embodied to allow such that a telephone's ring, or an alarm signal, be heard through it;

a Remote locator call-switch on an answering machine and/or a corresponding alarm sound and/or LED on a Remote need not be embodied;

a Remote may include a Caller ID display;

a Remote may remain free standing and/or include a number of various types of mounting structures, including, but not limited to, suction, hook-and-loop fasteners, etc.;

receptacles to hold Remote units may be embodied, on which may include a variety of attachment sources, including, but not limited to, double sided tape, hook-and-loop fasteners, magnetized material, or some other feasible attachment method;

a Remote and/or answering machine may incorporate voice scrambling and other eavesdrop securities;

a Remote's functions and capabilities may work with and/or be housed within any type of phone, including cellular, digital, analog or any other type of cordless phone;

a Remote's functions and capabilities that are included within corded, cellular, digital or analog phones can have non-external remote screening abilities, meaning that the remote audible screening of calls can be heard through the normal receiving ear portion (or venting) of the receiver;

a Remote's functions and capabilities can be included within a speaker phone;

a Remote's functions and capabilities that are included within a speaker phone can have the remote audible screening of the calls come through the same audio portion (or venting) as does the normal audio portion of the speaker phone or separately through its own audio portion (or venting);

an ear piece or earphones can be attached to a Remote for private screening use;

a Remote's functions and/or capabilities can be used with phone and/or answering systems that are already installed or can be installed within computer systems;

a Remote's features, functions, and capabilities may be included within a phone handset or receiver, the receiver may be corded or cordless;

in embodiments of a Remote that are included within a phone handset or receiver, the audio speaker venting (screening portion) may be on the external face of the receiver, may surround the receiver, may be on the internal face of the receiver;

in embodiments of a Remote that are included within a phone handset or receiver, the external audible screening may come through the same receiving piece or venting of the receiver as does the normal audio portion of the phone;

a Remote may be manufactured with a corded phone line built in or detachable (where a phone line can be inserted), or have a phone connector prong extending from Remote.

It is to be understood that the invention is not limited to any precise form of apparatus or example as noted above, and that various changes and modifications may be made by those skilled in the art without departing from the scope or the novel concepts of the invention and are to be construed as being within the ambit of the appended claims.

What is claimed is:

1. Apparatus for screening the message-content or subject matter of incoming messages selected from the group consisting of audio and data signal transmissions comprising:

a call or message capturing means with message answering means having recording means for recording or storing the incoming message-content or subject matter of incoming messages consisting of audio and/or data signal transmission calls or messages, said message answering means having a transmitter for transmitting the incoming message-content or subject matter of the incoming calls or messages consisting of audio and/or data signal transmissions while the incoming message-content or subject matter of incoming calls or messages are received; and a remote message screening device having a receiver for receiving the incoming message-content or subject matter of the incoming calls or messages consisting of audio and/or data signal transmissions and a loudspeaker for audibly emitting the incoming message-content or subject matter of the incoming calls or messages while said recording means receives and records the incoming message-content or subject matter of the incoming calls or messages whereby the user can audibly screen the incoming message-content or subject matter conveyed in the incoming audio and/or data signal transmissions of a caller's or sender's incoming voice and/or text message as the incoming message-content or subject matter of the messages are audibly emitted from said screening apparatus so that the user is able to ascertain and decide if the incoming message-content or subject matter of the caller's or sender's incoming message is important enough to establish a connection with the caller or sender of the incoming message while the caller or sender is still leaving the message and while it is still being received and recorded by said screening apparatus.

2. The apparatus of claim 1, further comprising: a speech synthesizer for converting the incoming message-content or subject matter of an incoming text or electronic mail message into an audible message to be audibly emitted by said loudspeaker whereby the user can audibly screen the incoming message-content or subject matter of a caller's or sender's incoming text or electronic mail message as the incoming message-content or subject matter of the incoming text or electronic mail messages are audibly emitted from said screening apparatus so that the user is able to ascertain and decide if the incoming message-content or subject matter of the caller's or sender's incoming text or electronic mail message is important enough to establish a connection with the caller or sender of the incoming message while the caller or sender is still leaving the message and while it is still being received and recorded by said screening apparatus.

3. The apparatus of claim 2, wherein said speech synthesizer and at least one of said answering means and said screening device are incorporated into a computer.

4. The apparatus of claim 1, wherein said recording means comprises a plurality of "mailboxes" for recording or storing the incoming calls and messages.

5. The apparatus of claim 2 wherein said remote message screening device is combined with a vehicle on-board communication system whereby the user can hear to screen the incoming message-content or subject matter conveyed in the incoming audio and/or data signal transmissions of a caller's or sender's incoming message as the incoming message-content or subject matter is audibly emitted through his vehicle on-board communication system so that the user can ascertain and decide if the incoming message-content or subject matter of the caller's or sender's incoming call or message is important enough to establish a connection through his vehicle on-board communication system with the caller or sender of the incoming message while the caller or sender is still leaving the message and while it is still being received and recorded by said screening apparatus.

6. The apparatus of claim 5, wherein said apparatus further comprises voice-activated operational controls for operating said remote message screening device and/or said message answering means.

whereby the user of said screening apparatus can use his voice to remotely operate the message answering means of said screening apparatus and/or the remote message screening device of said screening apparatus from said vehicle on-board communication system.

7. The apparatus of claim 2, wherein said remote call or message screening device is incorporated into a watch.

8. The apparatus of claim 2, wherein said call or message answering means has a base family code that allows communication with equipment having a matching family code; and said remote call or message screening device is programmable to have a remote family code to match the base family code of said call or message answering means, thereby permitting communication between said remote call or message screening device and said call or message answering means.

9. The apparatus of claim 2, wherein said speech synthesizer is further configured for converting the message-content or subject matter of recorded or stored text or electronic mail messages into an audible message to be audibly emitted by said loudspeaker whereby the user can listen to or re-listen to the message-content or subject matter of stored text or electronic mail messages through said loudspeaker.

10. The apparatus of claim 2, wherein said remote message screening device is a mobile wireless phone comprising an internet interface with means for connecting to the Internet, said mobile wireless phone having means for receiving and audibly screening the incoming message-content or subject matter of incoming calls and messages received from the internet while the caller or sender is still leaving the message whereby the user can audibly screen from said mobile wireless phone the incoming message-content or subject matter of incoming voice messages and/or the incoming message-content or subject matter of incoming speech synthesized text or email messages to ascertain and decide if the incoming message-content or subject matter of the caller's or sender's incoming message is important enough to establish a connection with the caller or sender of the incoming message while the caller or sender is still leaving the message and while the message is still being received and recorded.

11. The apparatus of claim 2 wherein said remote message screening device is a wireless mobile phone, said wireless mobile phone having means for selectively switching between audibly emitting the incoming message-content or subject matter of the incoming calls and messages while the incoming calls and messages are received and recorded or privately screening the incoming message-content or subject matter of the incoming calls and messages through normal audio earpiece of said wireless mobile phone while the incoming calls and messages are received and recorded, said wireless mobile phone including a remote pickup function wherein establishing a communication with incoming call or message will stop said call or message capturing means with call or message answering means from further recording the content of the incoming calls or messages whereby the user can audibly screen the incoming message-content or subject matter of incoming voice messages and/or the incoming message-content or subject matter of incoming speech synthesized text or email messages through said loudspeaker on said wireless mobile phone or privately screen through said normal audio earpiece of said wireless mobile phone.

12. The Apparatus of claim 1, wherein said remote message screening device further comprises a microphone and a transmitter for transmitting messages from said remote message screening device to a receiver in said message answering means.

13. The apparatus of claim 1, wherein said remote message screening device further comprises voice-activated remote operational controls for remotely operating said message answering means and/or said remote message screening device whereby the user of said screening apparatus can use his voice to remotely operate the message answering means of said screening apparatus and/or the remote message screening device of said screening apparatus.

14. The apparatus of claim 1, wherein said message answering means comprises a voice mail enabled telephone, whereby the incoming message-content or subject matter of voice mail messages can be screened with said remote message screening device as the incoming message-content or subject matter of the voice mail messages are received and recorded.

15. The apparatus of claim 1, wherein said remote message screening device is a wireless phone.

16. The apparatus of claim 1 a mobile wireless phone system having message capturing means for screening the incoming message-content of incoming calls and messages while the incoming calls and messages are still being recorded comprising:

a remote mobile wireless phone unit the message capturing means of the mobile wireless phone system having a transmitter for transmitting the incoming message-content of the incoming messages to said remote mobile wireless phone unit while the incoming message-content of incoming messages are received and recorded by said message capturing means; and said remote mobile wireless phone unit having a message screening device and receiver for receiving and screening the incoming message-content of the incoming messages from said message capturing means of the mobile wireless phone system while the incoming message-content of the incoming messages are being received and recorded whereby the user can screen the incoming message-content of incoming messages to ascertain and decide if the incoming message-content of the caller's or sender's incoming message is important enough to establish a connection with the caller or sender of the incoming message while the caller or sender is still leaving the message and while the message is still being received and recorded.

17. The apparatus of claim 1, wherein said remote message screening device further comprises remote operational means for remotely controlling said message answering means.

18. The apparatus of claim 1, wherein at least one of said remote message screening device and said message answering means is combined with a vehicle on-board communication system.

19. The apparatus of claim 1, wherein said apparatus further comprises voice-activated remote operational controls for remotely operating at least one of said message answering means and said remote call or message screening device.

20. The apparatus of claim 1, wherein said remote message screening device further comprises remote control means for remotely controlling said message answering means to replay the message-content or subject matter of recorded messages through said remote message screening device whereby the user has the option to remotely control said message answering means to replay a caller's or sender's voice or text message.

21. The apparatus of claim 1, wherein said apparatus comprises a plurality of remote message screening devices, and wherein said message answering means further comprises a switch for selectively choosing which of said plurality of remote message screening devices will receive the incoming messages.

22. The apparatus of claim 1, wherein said apparatus for screening the incoming message-content or subject matter of incoming messages from the group consisting of audio and data signal transmissions screens the incoming message-content or subject matter of incoming phone call messages, phone voicemail, Internet messages, instant messaging, text messaging, E-mail messages, and/or E-mail voicemail messages.

23. The apparatus of claim 1, wherein said message answering means further comprises a power connection configured for receiving power and for sending and receiving the incoming message-content or subject matter of incoming calls and messages as communication signals through said power connection; and said remote message screening device further comprises a power connection configured for receiving power and for sending and receiving the incoming message-content or subject matter of incoming calls and messages as communication signals through said power connection;

whereby the incoming message-content or subject matter of a caller's or sender's incoming call or message may be sent along the power connection as communication signals whereby the user can screen the incoming message-content or subject matter of a caller's or sender's incoming call or message after the caller or sender has commenced to the point of and is still leaving a message and while it is being received and recorded by said screening apparatus.

24. The apparatus of claim 1, further comprising means for changing the incoming message-content or subject matter conveyed in the incoming audio and/or data signal transmissions of a caller's or sender's incoming message to a visible text form wherein said apparatus includes a visual display with means to visually screen the incoming message-content or subject matter conveyed in a caller's or sender's incoming message as text whereby the user can hear to screen the incoming message-content or subject matter of an incoming call or message that is audibly emitted from said screening apparatus and/or read to screen the incoming message-content or subject matter of an incoming call or message as an incoming visible text message to ascertain and decide if the incoming message-content or subject matter of the caller's or sender's incoming call or message is important enough to establish a connection with the caller or sender of the incoming message while the caller or sender is still leaving the message and while the message is still being received and recorded.

25. The apparatus of claim 24, wherein at least one of said message answering means and said remote message screening device comprises an internet interface with means for connecting to the internet, said internet interface device having means for receiving and recording the incoming message-content or subject matter of incoming calls and messages received from the internet whereby the user can hear to screen or read to screen the incoming message-content or subject matter conveyed in the incoming audio and/or data signal transmissions of a caller's or sender's incoming voice or text message as the incoming message-content or subject matter of the incoming messages are audibly emitted or visually displayed from said screening apparatus so that the user is able to ascertain and decide if the incoming message-content or subject matter of the caller's or sender's incoming message is important enough to establish a connection with the caller or sender of the incoming message while the caller or sender is still leaving the message and while it is still being received and recorded by said screening apparatus.

26. The apparatus of claim 25, further comprising:

a speech synthesizer for converting the incoming message-content or subject matter of an incoming text or electronic mail message into an audible message to be audibly emitted by said loudspeaker simultaneously as the incoming text or electronic mail messages are being received and recorded whereby the user can hear to screen or read to screen the incoming message-content or subject matter conveyed in the incoming audio and/or data signal communication of a caller's or sender's incoming voice or text message as the incoming message-content or subject matter of the messages are audibly-emitted or visually displayed from said screening apparatus so that the user is able to ascertain and decide if the incoming message-content or subject matter of the caller's or sender's incoming message is important enough to establish a connection with the caller or sender of the incoming message while the caller or sender is still leaving the message and while it is still being received and recorded by said screening apparatus.

27. The apparatus of claim 25, wherein said internet interface device comprises a computer.

28. The apparatus of claim 25, wherein said internet interface device comprises a television receiver.

29. The apparatus of claim 25, further comprising:

a call waiting screening function for screening the incoming message-content or subject matter of subsequent or contemporaneous incoming calls or messages that arrive over a connection while the connection is occupied by said internet interface whereby the user can audibly screen or visually screen the incoming message-content or subject matter of subsequent or contemporaneous incoming calls or messages while the user is still on the occupied connection and after the caller or sender of the subsequent or contemporaneous incoming message has commenced to the point of and is still leaving a message and while it is still being received and recorded by said screening apparatus allowing the user to screen the incoming message-content or subject matter of the subsequent or contemporaneous incoming message to ascertain and decide if the incoming message-content or subject matter of the subsequent or contemporaneous incoming message is important enough for the user to interrupt his current occupied connection and establish a new or concurrent connection with the caller or sender of the subsequent or contemporaneous incoming message.

30. The apparatus of claim 24, wherein said remote message screening device further comprises a call waiting screening function for screening the incoming message-content or subject matter of subsequent or contemporaneous incoming calls or messages that arrive over a connection while the connection is otherwise occupied while said recording means receives and records the incoming message-content or subject matter of the subsequent or contemporaneous incoming calls or messages whereby the user can audibly screen or visually screen the incoming message-content or subject matter of subsequent or contemporaneous incoming messages while the user is still on the occupied connection and after the caller or sender of the subsequent or contemporaneous incoming message has commenced to the point of and is still leaving a message while it is still being received and recorded by said screening apparatus allowing the user to screen the incoming message-content or subject matter of the subsequent or contemporaneous incoming message to ascertain and decide if the incoming message-content or subject matter of the subsequent or contemporaneous incoming message is important enough for the user to interrupt his current occupied connection and establish a new or concurrent connection with the caller or sender of the subsequent or contemporaneous incoming message.

31. The apparatus of claim 24, further comprising means for selectively switching between audibly emitting the incoming message-content or subject matter of the incoming calls or messages while the incoming calls or messages are received and recorded and/or visually displaying the incoming message-content or subject matter of the incoming calls or messages as text while the incoming calls or messages are received and recorded whereby the user has the screening options to be able to selectively switch between visually displaying the incoming message-content or subject matter of an incoming call or message as text so as to be able to visually screen, audibly emitting the incoming message-content or subject matter of an incoming call or message so as to be able to audibly screen, or simultaneously visually displaying and audibly emitting the incoming message-content or subject matter of an incoming call or message so as to be able to visually screen and audibly screen at the same time.

32. The apparatus of claim 31, wherein said remote message screening device is a mobile wireless phone comprising an internet interface with means for connecting to the internet, said mobile wireless phone having means for receiving and screening the incoming message-content or subject matter of incoming voice or text messages received from the Internet while the caller or sender is still leaving the message whereby the user can hear to screen and/or read to screen the incoming message-content or subject matter of an incoming voice or text message received from the internet to ascertain and decide if the incoming message-content or subject matter of the caller's or sender's incoming message is important enough to establish a connection with the caller or sender of the incoming message while the caller or sender is still leaving the message and while it is still being received and recorded.

33. Apparatus for screening incoming telephone calls comprising:

a telephone answering means having recording means for recording incoming telephone messages and for directing the incoming telephone messages into a plurality of "mailboxes", said telephone answering means having a transmitter for transmitting the incoming telephone messages as audio signals simultaneously as the incoming telephone messages are received; and at least one remote call screening device having a receiver for receiving the audio signals and a loudspeaker for audibly emitting the incoming telephone messages simultaneously as the incoming telephone messages are received and recorded; wherein said remote call screening device includes a remote channel selector switch for selecting which of the plurality of "mailboxes" said remote call screening device will receive incoming telephone messages from.

34. The apparatus of claim 33, wherein said at least one remote call screening device comprises a plurality of remote call screening devices, and wherein each of said plurality of remote call screening devices includes a remote channel selector switch for selecting which of the plurality of "mailboxes" the remote call screening device will receive incoming telephone messages from.

35. The apparatus of claim 33, wherein said telephone answering means includes a remote pickup function wherein establishing a communication with any telephone extension of the same telephone line as said telephone answering means will stop said remote call screening device from audibly emitting the incoming telephone message.

36. The apparatus of claim 33, further comprising an activating switch located on a remote appliance in electronic communication with said apparatus, which when activated will stop said remote call screening device from audibly emitting the incoming telephone message.

37. The apparatus of claim 33, wherein said remote call screening device further comprises remote operational controls for remotely operating said telephone answering means.

38. The apparatus of claim 33, wherein said remote call screening device further comprises remote control means for remotely controlling said telephone answering means to replay recorded telephone messages from at least one of said plurality of "mailboxes" through said loudspeaker of said remote call screening device.

39. The apparatus of claim 33, wherein said answering means or said remote call screening device further comprises a caller identification means for further identifying the source of an incoming telephone call.

40. The apparatus of claim 33, wherein said remote call screening device further comprises a microphone and a transmitter for transmitting messages from said remote call screening device to a receiver in said telephone answering means and selectively recording the messages in at least one of said plurality of mailboxes.

41. Apparatus for screening incoming telephone calls comprising:

a first telephone answering means having recording means for recording incoming telephone messages and having a transmitter for transmitting the incoming telephone messages as audio signals on a first channel or frequency simultaneously as the incoming telephone messages are received;

a second telephone answering means having recording means for recording incoming telephone messages and having a transmitter for transmitting the incoming telephone messages as audio signals on a second channel or frequency simultaneously as the incoming telephone messages are received; and a remote call screening device having a receiver for receiving audio signals and a loudspeaker for audibly emitting incoming telephone messages simultaneously as the incoming telephone messages are received and recorded, said remote call screening device including a channel or frequency selector switch for operating said remote call screening device to audibly emit incoming telephone messages transmitted as audio signals on said first channel or frequency and/or on said second channel or frequency.

42. The apparatus of claim 41 further comprising:

a second remote call screening device having a receiver for receiving audio signals and a loudspeaker for audibly emitting incoming telephone messages simultaneously as the incoming telephone messages are received and recorded, said second remote call screening device including a channel or frequency selector switch for operating said second remote call screening device to audibly emit incoming telephone messages transmitted as audio signals on said first channel or frequency and/or on said second channel or frequency.

43. The apparatus of claim 41 wherein said first telephone answering means includes a first channel or frequency selector switch for operating said transmitter to transmit incoming telephone messages as audio signals on said first channel or frequency and/or on said second channel or frequency, and said second telephone answering means includes a second channel or frequency selector switch for operating said transmitter to transmit incoming telephone messages as audio signals on said first channel or frequency and/or on said second channel or frequency.

44. The apparatus of claim 41 wherein said remote call screening device further comprises remote operational controls for remotely operating said first telephone answering means and said second telephone answering means, including a remote recording switch for controlling said telephone answering means to record messages communicated from said remote call screening device.

45. The apparatus of claim 41, further comprising means for being programmable to have a base family code and a remote family code to match said base family code that allows communication with equipment having a matching family code.

46. Apparatus for screening incoming telephone calls comprising:

a telephone answering means having recording means for recording incoming telephone messages and having a transmitter for transmitting the incoming telephone messages as audio signals simultaneously as the incoming telephone messages are received, said telephone answering means including a channel or frequency selector switch for operating said transmitter to transmit incoming telephone messages as audio signals on a first channel or frequency and/or on a second channel or frequency;

a first remote call screening device having a receiver for receiving audio signals transmitted on said first channel or frequency and a loudspeaker for audibly emitting incoming telephone messages simultaneously as the incoming telephone messages are received and recorded; and a second remote call screening device having a receiver for receiving audio signals transmitted on said second channel or frequency and a loudspeaker for audibly emitting incoming telephone messages simultaneously as the incoming telephone messages are received and recorded.

47. The apparatus of claim 46 further comprising:

a second telephone answering means having recording means for recording incoming telephone messages and having a transmitter for transmitting the incoming telephone messages as audio signals simultaneously as the incoming telephone messages are received, said telephone answering means including a channel or frequency selector switch for operating said transmitter to transmit incoming telephone messages as audio signals on said first channel or frequency and/or on said second channel or frequency.

48. The apparatus of claim 46, wherein said first remote call screening device includes a first channel or frequency selector switch for operating said first remote call screening device to audibly emit incoming telephone messages transmitted as audio signals on said first channel or frequency and/or on said second channel or frequency, and said second remote call screening device includes a second channel or frequency selector switch for operating said second remote call screening device to audibly emit incoming telephone messages transmitted as audio signals on said first channel or frequency and/or on said second channel or frequency.

49. The apparatus of claim 46, wherein said first remote call screening device and said second remote call screening device further comprise remote operational controls for remotely operating said telephone answering means, including a remote recording switch for controlling said telephone answering means to record messages communicated from said remote call screening device.

50. The apparatus of claim 49, wherein said telephone answering means includes a record disable switch for selectively preventing said first remote call screening device and/or said second remote call screening device from recording messages to said telephone answering means.

51. The apparatus of claim 49, wherein said telephone answering means further comprises transmitter means for transmitting the content of said incoming telephone messages as text and said first remote call screening device and said second remote screening device having a receiver means for receiving the content of said incoming telephone messages as text simultaneously as the incoming calls and messages are received and recorded.

52. A combination cordless telephone receiver with answering machine and call screening functions handset for screening the incoming message-content or subject matter of incoming messages selected from the group consisting of audio and data signal transmissions comprising:

a handset having a speaker, a microphone, a handset receiver for receiving incoming telephone calls and messages consisting of audio and/or data signal transmission transmitted to said handset, a handset transmitter for transmitting signals from said handset, a message answering means within said handset for recording the incoming message-content or subject matter of incoming telephone messages consisting of audio and/or data signal transmission while a caller is leaving a message;

wherein said handset has a call screening mode in which the incoming message-content or subject matter of the incoming telephone calls and messages consisting of audio and/or data signal transmission transmitted to said handset is audibly emitted and/or visually displayed from said handset while the caller is still leaving the message and it is being received and recorded by said message answering means within said handset, whereby said combination cordless telephone receiver with answering machine and call screening functions handset eliminates the need for a separate answering machine recording unit and thereby facilitates the user's use of answering machine abilities at hand in said combination handset and the user is able to visually and/or audibly screen the incoming message-content or subject matter of a caller's or sender's incoming voice and/or text message from said combination handset as the incoming message-content or subject matter of the incoming messages are visually displayed and/or audibly emitted from said combination handset in order to ascertain and decide if the incoming message-content or subject matter of the caller's or sender's incoming message is important enough to establish a connection with the caller or sender of the incoming message from the said combination handset while the caller or sender is still leaving the incoming message and while it is still being received and recorded.

53. The combination cordless telephone receiver with answering machine and call screening functions handset of claim 52, further comprising a connection means for allowing communication with a telephone line, whereby connection means includes a transmitter for transmitting incoming telephone messages to said combination handset and a receiver for receiving signals transmitted from said combination handset.

54. The combination cordless telephone receiver with answering machine and call screening functions handset of claim 53 wherein said connection means for allowing communication with a telephone line, further comprises a recharging means for recharging a battery in said combination handset.

55. Apparatus for screening the incoming message-content or subject matter of incoming messages selected from the group consisting of audio and data signal transmissions comprising:

a call or message capturing means with message answering means having recording means for recording or storing the incoming message-content or subject matter of incoming calls and messages, said message answering means having a power connection for receiving power and for sending and receiving communication signals through said power connection for transmitting the incoming message-content or subject matter of the incoming calls and messages consisting of audio and/or data signal transmissions while said recording means receives and records the incoming message-content or subject matter of the incoming messages; and a remote message screening device having a power connection for receiving power and for sending and receiving communication signals through said power connection for receiving the incoming message-content or subject matter of incoming calls and messages consisting of audio and/or data signal transmissions and a loudspeaker for audibly emitting the incoming message-content or subject matter of the incoming messages while said recording means receives and records the incoming message-content or subject matter of the incoming messages whereby the incoming message-content or subject matter of incoming calls and messages consisting of audio and/or data signal transmissions of a caller's or sender's incoming voice and/or text message may be sent along the power connection whereby the user can screen the incoming message-content or subject matter conveyed in the incoming audio and/or data signal transmissions of a caller's or sender's incoming message after the caller or sender has commenced to the point of and is still leaving the message and while the message is still being received and recorded by said screening apparatus.

56. The apparatus of claim 55, wherein said message answering means is further configured for transmitting the message-content or subject matter of recorded or stored calls and messages as audio an/or data signals through said power connection, and said remote message screening device is further configured for receiving the message-content or subject matter of recorded or stored calls and messages as audio an/or data signals through said power connection whereby the message-content or subject matter of a caller's or sender's recorded or stored message may be sent through said power connection so that the user can access or re-access the message-content or subject matter of a caller's or sender's recorded or stored message.

57. The apparatus of claim 55, wherein said remote message screening device further comprises means for transmitting the message-content or subject matter of calls or messages through said power connection and said message answering means further comprises means for receiving the message-content or subject matter of the calls or messages through said power connection whereby the audio and/or data signal transmissions of the incoming message-content or subject matter of a caller's or sender's incoming call or message may be sent through said power connection whereby the user can screen the incoming message-content or subject matter conveyed in the incoming audio and/or data signal transmissions of a caller's or sender's incoming message after the caller or sender has commenced to the point of and is still leaving the message and while the message is still being received and recorded by said screening apparatus.

58. Apparatus for screening the content of incoming calls and/or messages comprising:

a call or message answering means having recording means for recording or storing the content of incoming calls and messages, said call or message answering means having a transmitter for transmitting the content of the incoming calls and messages as audio and/or data signals while the incoming calls and messages are received; and a remote call or message screening device having a receiver for receiving the content of the incoming calls and messages as audio and/or data signals and a loudspeaker for audibly emitting the content of the incoming calls or messages while said recording means receives and records the content of the incoming calls or messages;

wherein said apparatus comprises a plurality of remote call or message screening devices, and wherein said call or message answering means further comprises a switch for selectively choosing which of said plurality of remote call or message screening devices will receive the incoming messages.

59. The apparatus of claim 58, wherein said apparatus further comprises a speech synthesizer for converting the content of incoming text or electronic mail message into an audible message to be audibly emitted by said loudspeaker on said plurality of remote call or message screening devices.

60. Apparatus for screening the content of incoming calls and/or messages comprising:

a call or message answering means having recording means for recording or storing the content of incoming calls and messages, said call or message answering means having a transmitter for transmitting the content of the incoming calls and messages as audio and/or data signals simultaneously as the incoming calls and messages are received; and a remote call or message screening device having a receiver for receiving the content of the incoming calls and messages as audio and/or data signals and a loudspeaker for audibly emitting the content of the incoming calls or messages while said recording means receives and records the content of the incoming calls or messages; and a speech synthesizer for converting the content of an incoming text or electronic mail message into an audible message to be audibly emitted by said loudspeaker; and means for selectively switching between audibly emitting the content of the incoming calls and messages while the incoming calls and messages are received and recorded and/or visually displaying the content of the incoming calls and messages while the incoming calls and messages are received and recorded.

61. Apparatus for screening incoming calls and/or messages comprising:

a call or message capturing means with call or message answering means having recording means for recording or storing the incoming message-content or subject matter of incoming calls and messages, said call or message capturing means with call or message answering means having a transmitter for transmitting the incoming message-content or subject matter of the incoming calls and messages as audio and/or data signals while the incoming message-content or subject matter of the incoming calls and messages are received; and a remote call or message screening device having a receiver for receiving the incoming message-content or subject matter of the incoming messages as audio and/or data signals while incoming message-content or subject matter of the incoming calls or messages are received and recorded; and a loudspeaker on said remote call or message screening device for audibly emitting the incoming message-content or subject matter of the incoming calls or messages while the incoming calls or messages are received and recorded.

wherein said remote call or message screening device is a wireless mobile phone, said wireless mobile phone having means for selectively switching between audibly emitting the content of the incoming calls and messages while the incoming calls and messages are received and recorded or privately screening the content of the incoming calls and messages through normal audio earpiece of said wireless mobile phone while the incoming calls and messages are received and recorded, said wireless mobile phone including a remote pickup function wherein establishing a communication with incoming call will stop said call or message capturing means with call or message answering means from further recording the content of the incoming calls and messages.

62. Apparatus for screening the incoming message-content or subject matter of incoming audio and/or data signals as voice calls comprising:

a call answering means having recording means for recording or storing the content of incoming audio and/or data signals as voice calls said call answering means having a transmitter for transmitting the incoming message-content or subject matter of the incoming calls while the incoming calls are received; and a remote call screening device having a receiver for receiving the incoming message-content or subject matter of the incoming audio and/or data signals as voice calls and a speaker means for audibly screening the incoming message-content or subject matter of the incoming calls while the incoming calls are received and recorded; and a call waiting screening function for audibly screening the incoming message-content or subject matter of subsequent or contemporaneous incoming calls that arrive over a connection while the connection is otherwise occupied whereby the user can audibly screen the incoming message-content or subject matter of subsequent or contemporaneous incoming calls while the user is still on the occupied connection and after the caller of the subsequent or contemporaneous incoming message has commenced to the point of and is still leaving a message and while it is still being received and recorded by said screening apparatus allowing the user to audibly screen to the incoming message-content or subject matter of the subsequent or contemporaneous incoming message ascertain and decide if the incoming message-content or subject matter of the subsequent or contemporaneous incoming call is important enough for the user to interrupt his current occupied connection and establish a new or concurrent connection with the caller of the subsequent or contemporaneous incoming call.

63. Apparatus of a wireless mobile phone system including a wireless mobile phone unit with Internet Interface with means to connect to the Internet, for screening the message-content of incoming messages from the Internet comprising:

an incoming call or message capturing means with message answering means having recording means for recording or storing the incoming message-content of incoming calls or messages, said incoming call or message capturing means with message answering means of said wireless mobile phone system having a transmitter for transmitting the incoming message-content of the incoming calls or messages to said wireless mobile phone unit while the incoming message-content of incoming calls or messages are still being received by said incoming call or message capturing means; and said wireless mobile phone unit including a message screening device having a receiver for receiving from said incoming call or message capturing means the incoming message-content of incoming calls or messages and a loudspeaker for emitting audible message-content of incoming calls or messages while said recording means receives and records the incoming message-content of the incoming calls or messages whereby the user can screen from said mobile wireless phone unit the incoming message-content of the incoming caller's or sender's incoming call or message so that the user is able to ascertain and decide if the incoming message-content of the caller's or sender's incoming message is important enough to establish a connection with the caller or sender of the incoming message while the caller or sender is still leaving the message and while it is still being received and recorded.

64. The apparatus of claim 63, further comprising means for changing incoming message-content of an incoming caller's or sender's incoming audible message to a visible text form.

wherein said apparatus includes a visual display with means to visually screen the incoming message-content of a caller's or sender's incoming message as text whereby the user can hear to screen the incoming message-content of an incoming call or message that is audibly emitted from said screening apparatus and/or read to screen the incoming message-content of an incoming call or message as an incoming visible text message to ascertain and decide if the incoming message-content of the caller's or sender's incoming call or message is important enough to establish a connection with the caller or sender of the incoming message while the caller or sender is still leaving the message and while the message is still being received and recorded.

65. The apparatus of claim 63, further comprising means for selectively switching between screening the incoming message-content of the incoming calls or messages audibly while the incoming calls or messages are received and recorded and/or screening the incoming message-content of the incoming calls or messages visually while the incoming calls or messages are received and recorded whereby the user has the screening options to be able to selectively switch between visually displaying incoming message-content of an incoming call or message so as to be able to visually screen, audibly emitting incoming message-content of an incoming call or message so as to be able to audibly screen, or simultaneously visually displaying and audibly emitting the incoming message-content of an incoming call or message so as to be able to visually screen and audibly screen at the same time.

* * * * *